United States Patent
Rubens

(10) Patent No.: US 11,658,886 B2
(45) Date of Patent: May 23, 2023

(54) METHODS AND SYSTEMS OF FACILITATING PREDICTIVE INTENT-BASED ROUTING OF SERVICE REQUESTS

(71) Applicant: SentioCX B.V., Eemnes (NL)

(72) Inventor: Ronald Charles Rubens, Eemnes (NL)

(73) Assignee: SentioCX B.V., Eemnes (NL)

( * ) Notice: Subject to any disclaimer, the term of this patent is extended or adjusted under 35 U.S.C. 154(b) by 0 days.

(21) Appl. No.: 17/899,420

(22) Filed: Aug. 30, 2022

(65) Prior Publication Data
US 2023/0117113 A1 Apr. 20, 2023

Related U.S. Application Data

(60) Provisional application No. 63/257,914, filed on Oct. 20, 2021.

(51) Int. Cl.
*H04M 3/00* (2006.01)
*H04M 5/00* (2006.01)
(Continued)

(52) U.S. Cl.
CPC ........ *H04L 41/5074* (2013.01); *H04M 3/523* (2013.01)

(58) Field of Classification Search
CPC ............. H04M 3/5175; H04M 3/5166; H04M 3/5191; H04M 3/5233; H04M 3/5237; H04M 3/5183; H04M 3/5232; H04M 2203/355; H04M 3/4936; H04M 2201/42; H04M 3/42382; H04M 3/5141; H04M 2203/357; H04M 3/523; H04M 2203/402; H04M 2203/404; H04M 3/5238;
(Continued)

(56) References Cited

U.S. PATENT DOCUMENTS 10,630,840 B1    4/2020 Karp
10,692,606 B2 *  6/2020 Bender ................ A61B 5/7267
(Continued)

FOREIGN PATENT DOCUMENTS

WO    WO2017192684 A1    11/2017

OTHER PUBLICATIONS

Mamgain, Devashish, Chatbot Human Handoff: Seamless Human takeover, Kommunicate, Feb. 11, 2019 <URL: https://www.kommunicate.io/blog/chatbot-human-handoff/>.

*Primary Examiner* — Kharye Pope

(57) ABSTRACT

A method of facilitating predictive intent-based routing of service requests. Accordingly, the method may include receiving a service request data from a user device, initiating a chatbot, retrieving a service portfolio based on the receiving of the service request data, processing the service portfolio and the service request data, determining a service level, analyzing the service request data using a first machine learning model, determining an intent based on the analyzing, generating an adjusted service level based on the intent using a second machine learning model, assigning an agent to a user of the at least one user based on the adjusted service level, generating a service notification for the agent based on the assigning, transmitting the service notification (Continued)

to the user device and an agent device associated with the agent, and storing the service request data, the service notification, and the adjusted service level.

16 Claims, 21 Drawing Sheets

(51) Int. Cl.
  *H04L 12/66* (2006.01)
  *H04L 41/5074* (2022.01)
  *H04M 3/523* (2006.01)

(58) Field of Classification Search
  CPC ............ H04M 3/58; H04M 2203/408; H04M 3/4365; H04L 51/02; H04L 67/10; H04L 51/04; H04L 67/306; H04L 12/1859; H04L 41/16; H04L 67/63; H04L 41/5019; H04L 41/5009; G06N 20/00; G06N 5/04; G06N 3/08; G06N 3/042; G06N 7/02; G10L 15/22; G10L 2015/223; G10L 15/1822; G10L 15/1815; G10L 25/63; G10L 2015/088; G10L 15/02; G06F 21/32; G06F 1/163; G06F 2203/011
  See application file for complete search history.

(56) References Cited

U.S. PATENT DOCUMENTS

| | | | |
|---|---|---|---|
| 11,074,484 B2 | 7/2021 | Zhou | |
| 2010/0274637 A1* | 10/2010 | Li | G06Q 10/06 |
| | | | 379/265.06 |
| 2011/0141919 A1 | 6/2011 | Singh | |
| 2013/0013359 A1* | 1/2013 | Kohler | G06Q 10/06311 |
| | | | 705/7.13 |
| 2014/0169548 A1* | 6/2014 | McDaniel | H04M 3/5175 |
| | | | 379/265.09 |
| 2016/0036978 A1* | 2/2016 | Rybachenko | H04M 3/5233 |
| | | | 379/265.11 |
| 2017/0032168 A1* | 2/2017 | Kim | H04L 63/0861 |
| 2017/0147962 A1* | 5/2017 | Ijack | G06Q 10/063118 |
| 2019/0213999 A1 | 7/2019 | Grupen et al. | |
| 2021/0029246 A1* | 1/2021 | Erhart | H04M 3/5183 |
| 2021/0126891 A1* | 4/2021 | Salter | H04L 51/02 |
| 2021/0157989 A1 | 5/2021 | Orr et al. | |
| 2021/0203784 A1* | 7/2021 | Konig | G06Q 30/01 |
| 2022/0101220 A1* | 3/2022 | Wicaksono | H04M 3/5233 |
| 2022/0215324 A1* | 7/2022 | Bergher | H04M 3/5175 |
| 2022/0400091 A1* | 12/2022 | Wyss | H04L 65/40 |

* cited by examiner

METHODS AND SYSTEMS OF FACILITATING PREDICTIVE INTENT-BASED ROUTING OF SERVICE REQUESTS

FIELD OF THE INVENTION

Generally, the present disclosure relates to the field of data processing. More specifically, the present disclosure relates to methods and systems of facilitating predictive intent-based routing of service requests.

BACKGROUND OF THE INVENTION

The field of data processing is technologically important to several industries, business organizations, and/or individuals.

Despite the almost innumerable applications, however, existing contact center and conversational AI vendors have several limitations to effectively bridge the conversational AI solution with a mechanism to make live agents accessible and to match high priority chats with agents with matching skills and highest proficiency levels to create an optimum of chatbot utilization on the one hand and live interaction on the other hand.

Existing techniques for facilitating predictive intent-based routing within self-adjusted service levels are deficient with regard to several aspects. For instance, current technologies do not determine friction in automated dialogues and hence the ability to route the incoming chat to live agents for further handling. In other words, when users have a desire to talk to a live agent, they often need to dial a telephone number and explain the service request from scratch. Furthermore, current technologies allow a transfer to a live agent as a blind transfer to an agent which is usually a fixed extension number or present 'open chats' in a queue for agents to be handled and picked out of a queue manually. Moreover, current technologies do not take into account intelligent routing based on self-adjusted service levels based on urgency/importance of the intent in order to maintain an optimum of chatbot usage and live human interaction without constant configuration of resource allocation.

Therefore, there is a need for improved methods and systems for facilitating predictive intent-based routing within self-adjusted service levels that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating predictive intent-based routing of service requests, in accordance with some embodiments. Accordingly, the method may include receiving, using a communication device, a service request data from at least one user device associated with at least one user. Further, the service request data may include a service request for receiving at least one service for at least one issue faced by the at least one user and a service data. Further, the method may include initiating, using a processing device, a chatbot based on the service request. Further, the service data may include a conversational command for the chatbot. Further, the method may include retrieving, using a storage device, a service portfolio based on the receiving of the service request data. Further, the service portfolio defines a priority of the service request based on basic service levels. Further, the method may include processing, using the processing device, the service portfolio and the service request data. Further, the method may include determining, using the processing device, a service level based on the processing. Further, the service level represents a time for the service request to be answered. Further, the method may include analyzing, using the processing device, the service request data using a first machine learning model. Further, the method may include determining, using the processing device, an intent based on the analyzing. Further, the method may include generating, using the processing device, an adjusted service level based on the intent using a second machine learning model. Further, the second machine learning model may be trained for adjusting the service level based on classifying the intent for generating the adjusted service level. Further, the method may include assigning, using the processing device, an agent to a user of the at least one user based on the adjusted service level. Further, the agent provides the at least one service to the at least one user. Further, the method may include generating, using the processing device, a service notification for the agent based on the assigning. Further, the method may include transmitting, using the communication device, the service notification to at least one of the at least one user device and at least one agent device associated with the agent. Further, the method may include storing, using the storage device, at least one of the service request data, the service notification, and the adjusted service level.

Importantly, the method disclosed herein does not simply escalate a service request to a group of possible agents. Rather, a handshake occurs with an agent with a specific skill set who is ready to respond appropriately to the service request.

Further disclosed herein is a system of facilitating predictive intent-based routing of service requests, in accordance with some embodiments. Accordingly, the system may include a communication device configured for receiving a service request data from at least one user device associated with at least one user. Further, the service request data may include a service request for receiving at least one service for at least one issue faced by the at least one user and a service data. Further, the communication device may be configured for transmitting a service notification to at least one of the at least one user device and at least one agent device associated with the agent. Further, the system may include a processing device communicatively coupled with the communication device. Further, the processing device may be configured for initiating a chatbot based on the service request. Further, the service data may include a conversational command for the chatbot. Further, the processing device may be configured for processing the service portfolio and the service request data. Further, the processing device may be configured for determining a service level based on the processing. Further, the service level represents a time for the service request to be answered. Further, the processing device may be configured for analyzing the service request data using a first machine learning model. Further, the processing device may be configured for determining an intent based on the analyzing. Further, the processing device may be configured for generating an adjusted service level based on the intent using a second machine learning model. Further, the second machine learning model may be trained for adjusting the service level based on the classifying the intent for generating the adjusted service level. Further, the processing device may be configured for assigning an agent to a user of the at least one user based on the adjusted service level. Further, the agent provides the at least one service to the at least one user. Further, the processing device may be configured for generating the service notification for the agent based on the assigning. Further, the system may include a storage device communicatively coupled with the communication device. Further, the storage device may be configured for retrieving the service portfolio based on the receiving of the service request data. Further, the service portfolio defines a priority of the service request based on basic service levels. Further, the storage device may be configured for storing at least one of the service request data, the service notification, and the adjusted service level.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
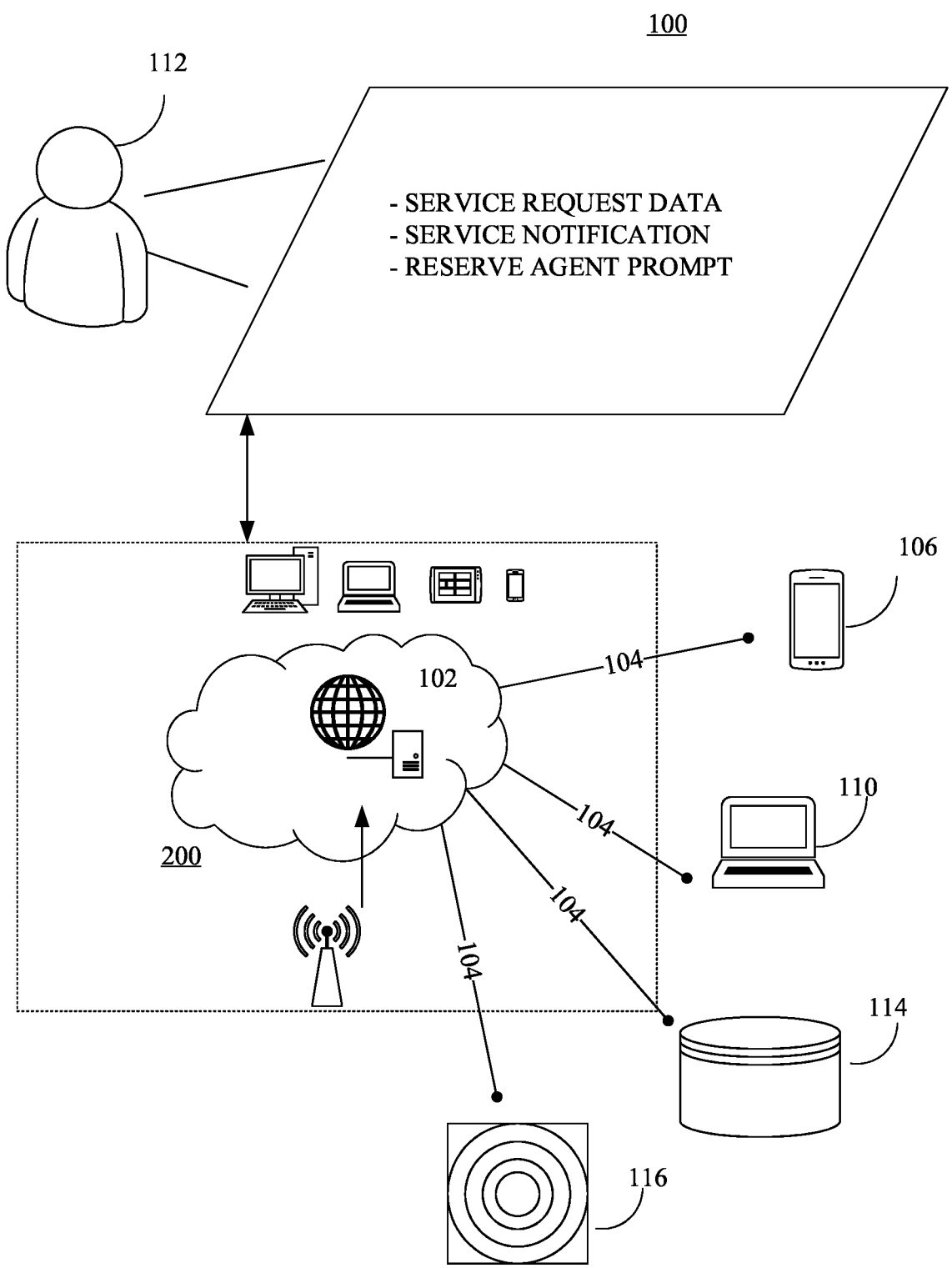
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems of facilitating predictive intent-based routing of service requests, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part.

Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems of facilitating predictive intent-based routing of service requests. Further, the disclosed system may be configured to create and maintain optimum chatbot usage and live human interaction. Further, the disclosed system relates generally to conversational AI, call centers, or other call processing systems in which automated bots are used and service requests or other types of media are distributed among several service agents for handling.

The advances in artificial intelligence have led to the automation of processes and the augmentation of human skills. In particular, Conversational AI and bot technology make it possible to automate responses based on 'intents', 'entities', and pre-defined rules. Furthermore, Customer Experience Management (CXM) solutions provide content-based marketing tools and provide automation for self-service and automated responses through chat, mail, and other media.

The disclosed system may define basic service levels (measured in seconds: sec.) in which a 'chat', 'voice' or 'video' call needs to be answered by an agent with a pre-defined skill. Subsequently, the chat or (voice/video) call with the highest priority will be routed based on the highest value of the calculation: (Current Waiting Time (CWT)+ Predicted Waiting Time (PWT)) divided by the administered Service Objective for a particular skill. Further, the disclosed system may be configured for adjusting the aforementioned ratio by capturing 'intents' from a bot and classifying the intents using what is called intent-classification through a 'management tool which allows the manager or supervisor to (1) classify pre-populated 'intents' from a bot which will lead to a transfer to 'live agents' and add intents manually, (2) provide a multi-dimensional ranking to the intent-classifier on initially importance and urgency and optionally emotion, which will result in adjusting the aforementioned ratio to what is called 'adjusted service level' (ASL). For instance: in a conversational AI application for an airline, a customer identified as a platinum customer with an urgent need to talk to a live agent as he missed his flight and has a desire to have a live agent intervene. Platinum users have been assigned a service level objective of 10 seconds for live-chat, but because the intent "miss flight" is urgent, the intent classifier generates a value of 40%, which will lead to a reduction of the pre-defined service level from 10 seconds to 6 seconds. The result is that these chat sessions may be transferred to a live agent (because of intent classification) with a higher priority (as the value of (CWT+PWT)/ASL has increased).

Further, in the event that service levels have exceeded a threshold, reserve agents (i.e. a pool of knowledge workers or informal call center agents) may be notified through an automated tool. The threshold is referred to as the Threshold for Reserve Agents (TRA) and may be included in the following computation to determine whether (CWT+PWT) has exceeded the value of (ASL+TRA). Once (CWT+PWT) has exceeded the value of (ASL+TRA), previously identified reserve agents will be automatically notified using a push notification to a mobile phone, tablet, or laptop—even if they are not logged on as an available agent. The push notification may request the reserve agent to make him/herself available to answer (an) incoming chat(s).

Further, the disclosed system may be configured for automatically de-classifying intents when agent capacity remains insufficient. When the agent capacity eventually becomes sufficient, the intends may be automatically re-classified. Further, intent classification was previously done to identify which intents may lead to a hand-over to a live agent. However, in the event that CWT+PWT continues to exceed ASL+TRA and the reserve agent allocation remains insufficient for a duration of 20 minutes (the duration of 20 minutes is illustrative, this duration may be changed to a lower or higher number of minutes), the low priority intents may be automatically de-classified. In other words, the low-priority chats remain within the bot as long as service levels cannot be met.

Further, the disclosed system may be based on an intent-based intelligent routing mechanism ensuring that friction in a bot dialogue and urgent requests for help from existing and new customers are recognized. Furthermore, the 4 steps in the intent-based intelligent routing algorithm ensure that human intervention in a chat dialogue is optimized and the availability of agents or knowledge workers may be matched with the most critical requests for the agents to intervene. In other words, an optimum of chatbot usage and live human interaction has been reached. This usage of an adjusted service level is different from the traditional ways of pushing chats to agents based on the First-In-First-Out (FIFO) principle OR presenting multiple chats into common queues and having the agent pick out the chat for further handling.

The disclosed system may be associated with an engine that results in a frictionless Customer Experience (CX) after customers enter a 'bot-dialogue' or Messaging service through tools such as embedded conversational AI dialogues on websites, WhatsApp, Facebook Messenger, Apple chat, Viber, etc. Further, the disclosed system may allow the customers to have immediate access to live customer agents within adjustable service levels. This adjustment of service levels is based on perceived friction in a bot-dialogue which is detected based on intents and entities which have been classified based on importance, urgency & optionally emotion combined with customer profile classification (e.g. importance of a customer such as platinum, gold, silver members). In that case, the 'intent classification' matrix can be expanded by a third axis, which will capture 'sentiment' as an output parameter from a BOT's API.

Further, the engine sits in between messaging tools, conversational chatbot/AI systems, analytics/BI infrastructure on the one hand, and tools for agents, supervisors, and admin on the other hand. Optionally, agents may be made available by identifying and blocking their availability through a CTI link such as TSAPI (Telephony Services Application Programming Interface). Further, the tools for agents may be now very common and are often integrated into Customer Service & Support applications such as Zendesk or Customer Relationship Management applications such as Salesforce.com.

The routing algorithm and the way it makes routing decisions for chats to available agents is based on the following elements:

1. Calculating a Factor that Will Prioritize Routing

The position in the matrix leads to a vector that can be quantified for the purpose of adjusting the (basic) Service Level to the Adjusted Service Level (ASL). This vector number called $\varphi(i,u)$ will expand into $\varphi(i,u,s)$ once sentiment is added as a third dimension. The 's' represents the sentiment indicator.

As CWT+PWT is compared with Adjusted Service Levels (based on intent and customer profile), some chats with an associated service level may remain in queue despite having an agent available to handle the respective chat session. The underlying reason is to match the best-skilled agents with the highest priority/highest friction chat sessions as much as possible; some customers might come in seconds later with more urgent needs for human intervention.

Figure 14:
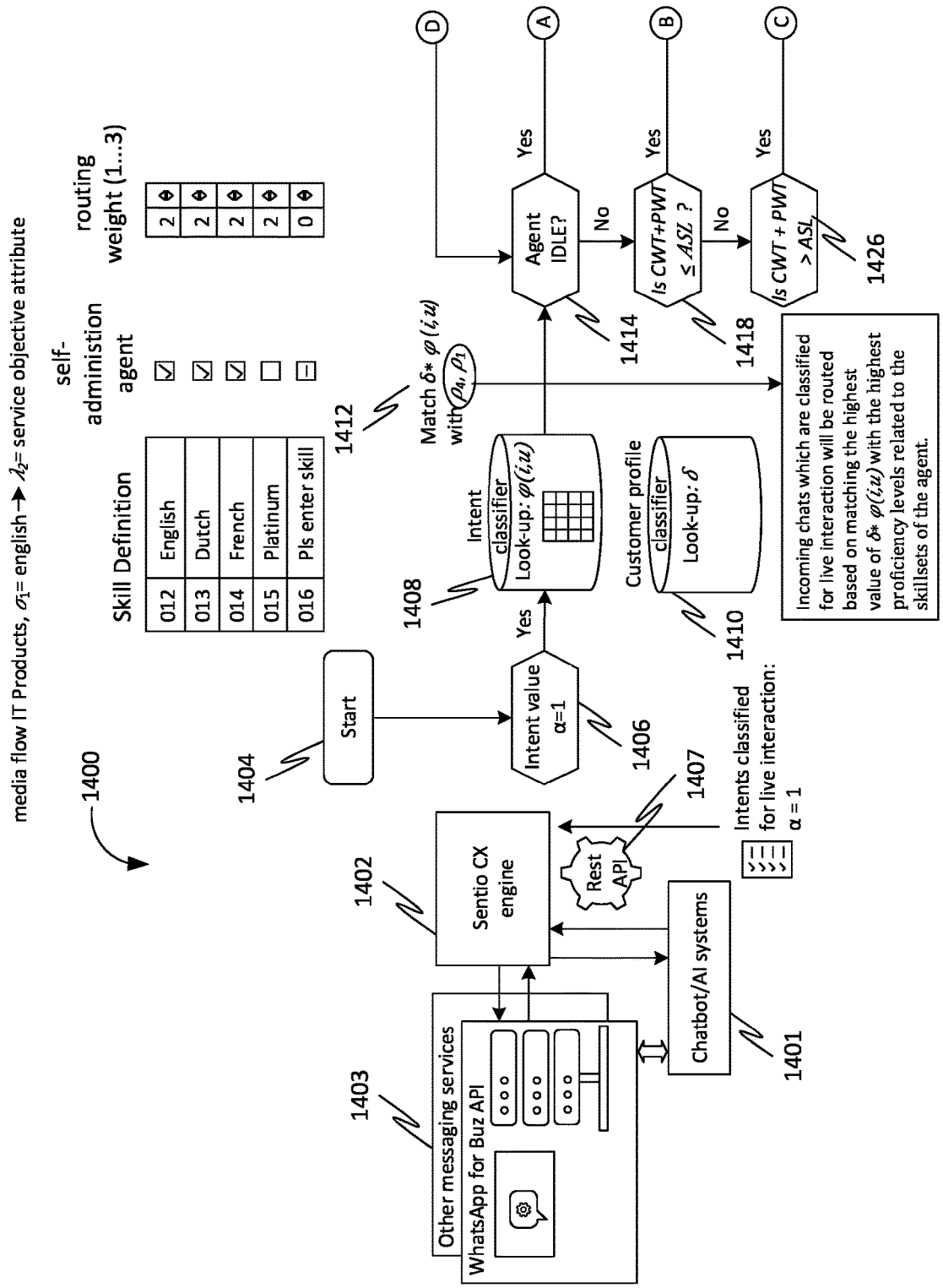
FIG. 14 is a flow diagram of a method for facilitating predictive intent-based routing within self-adjusted service levels, in accordance with some embodiments.
Figure 15:
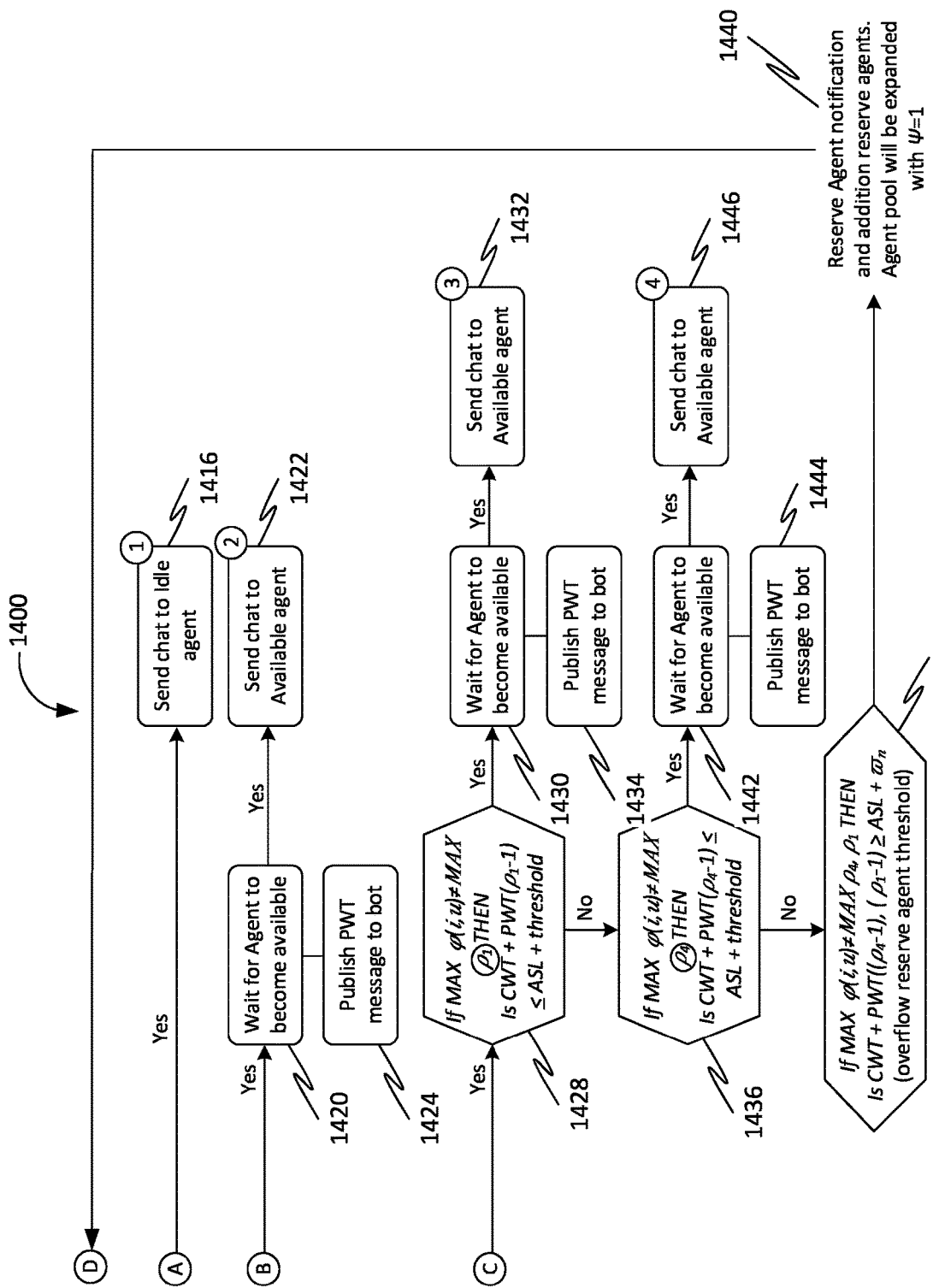
FIG. 15 is a continuation flow diagram of FIG. 14.

2. Matching Highest Friction/Most Valued Customers with Highest Proficiency Levels of Most Relevant Skills of Agents Predictive Wait Time $\Pi_{mf}$ may be calculated by deriving the average media duration (by media flow) and availability of agents while taking into account that the highest value of $\delta^*\varphi(i,u)$ is matched with the highest proficiency levels of the Agent's skills. Furthermore, a routing weight is defined by the manager to define the priority of matching. Further, the routing flow is shown in FIG. 14 and FIG. 15.

3. Adding 'Non-Dedicated Agents' as Reserve Agents to the Agent Pool to Increase Agent Capacity in Case Thresholds Continue to be Exceeded.

The last step of the above workflow includes a mechanism to add so-called reserve agents. These reserve agents will be notified once (CWT+PWT)>(ASL+TRA) for a specific duration (e.g. 20 minutes). Notification is done by means of a push notification on mobile devices, which may provide a link with a request to the knowledge worker/reserve agent to log on to an agent app in order to further handle incoming chats.

4. Automatically De-Classifying Intents when Service Levels Continue to be Exceeded and a Pool of Reserve Agents is Exhausted The final step is to declassify low priority intents when service levels continue to be exceeded and no more reserve agents may be assigned in order to keep lower priority chats within the bot.

The algorithm is using intent classifiers to be administered manually and to be set at a value of $\alpha=1$ for agent hand-over once service levels+thresholds can be met.

Pairing will occur between highest value of $\delta*\varphi(i,u)$ AND highest proficiency level of the most relevant skill (i.e. highest routing weight). Lower values of $\delta*\varphi(i,u)$ can lead to temporary automatic declassification of the relevant intent once service levels+thresholds cannot be met. The algorithm may assign a classification based on 'probability score' and 'sentiment score' from the NLU (e.g. LUIS). These two scores can be used in the vector $\delta*\varphi$.

Further, the algorithm may be using intent classifiers automatically declassified by setting the intent classifier back to $\alpha=0$ in the event that service levels and thresholds continue to be exceeded. The low value intents may be declassified first until (CWT+PWT)<(ASL+TRA). After a certain interval (e.g. 20 minutes), the highest value intents which were initially set to $\alpha=0$ during the declassification will be classified again as long as (CWT+PWT)<(ASL+TRA).

Further, the disclosed system may be configured for automatic classification of intents for live interaction. Machine learning may be applied to automatically adjust intent classification through probabilities in natural language understanding from multiple NLU libraries. In this case, multiple queries may be made to multiple NLU libraries in order to retrieve the highest probability of the customer's utterance. The lowest probability intents with the highest-ranking customer profiles will then be prioritized first in order to route the chat to an available agent with the highest proficiency level.

Figure 16:
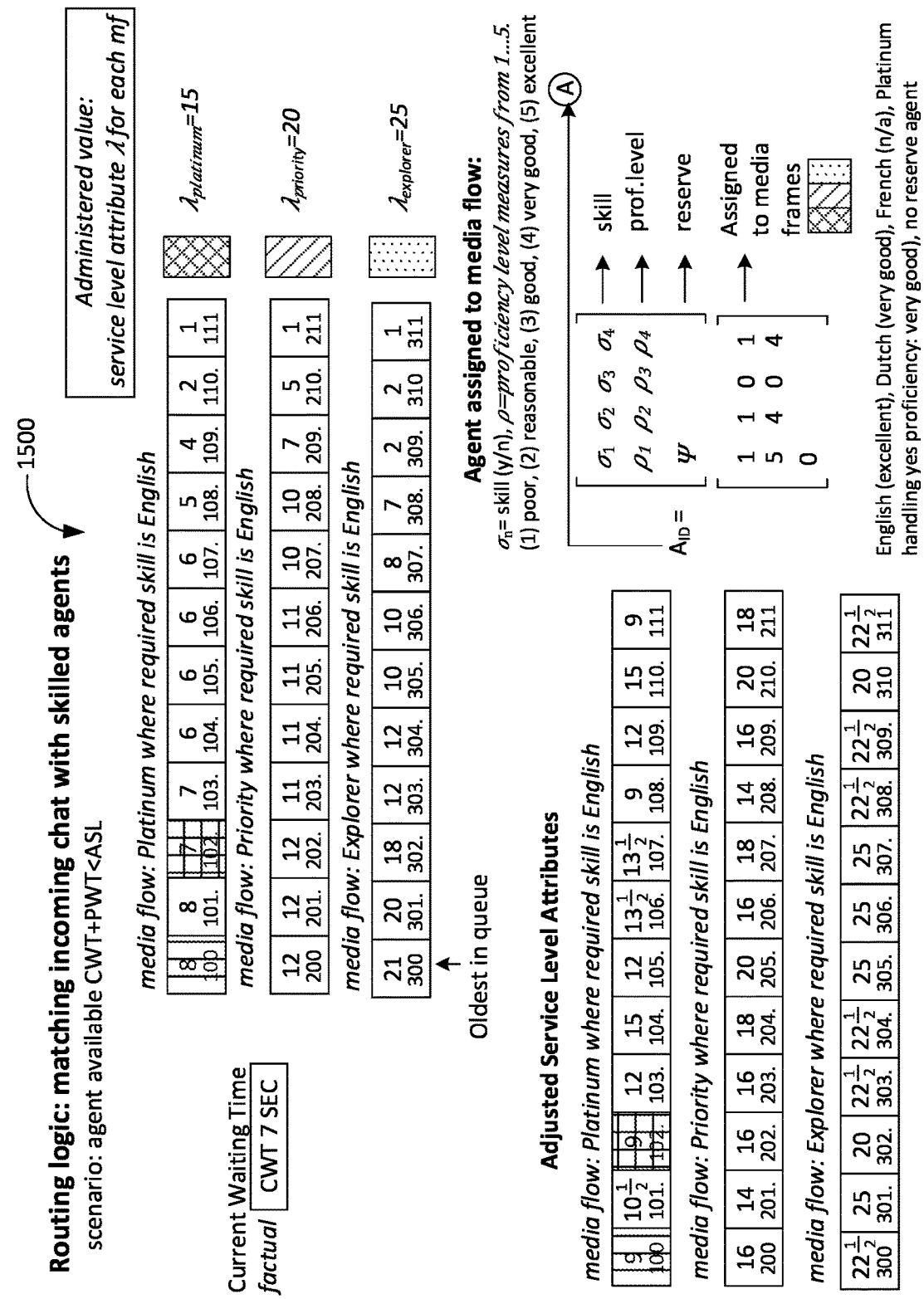
FIG. 16 illustrates a routing logic associated with the routing algorithm in a first scenario for facilitating predictive intent-based routing within self-adjusted service levels, in accordance with some embodiments.
Figure 17:
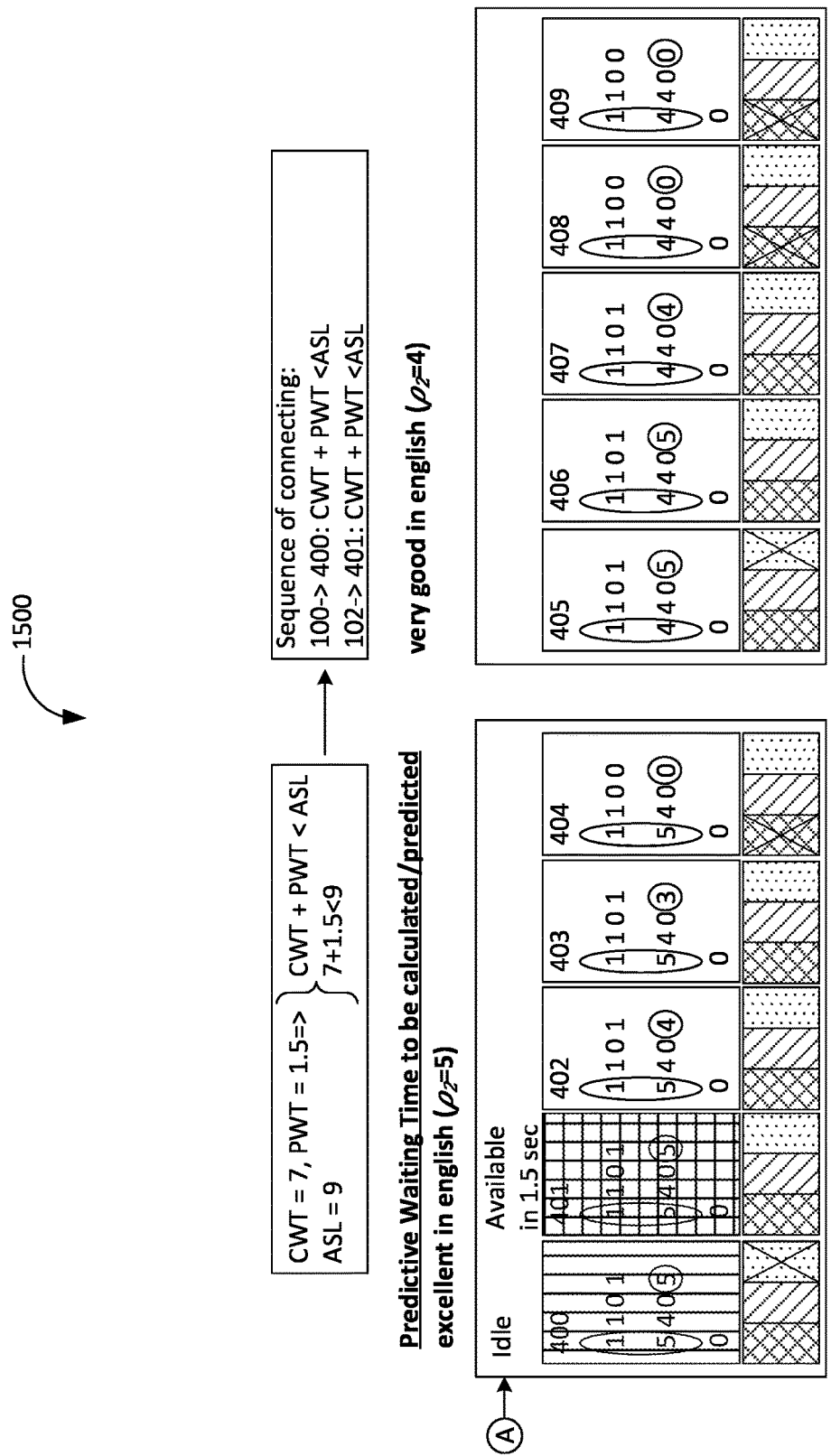
FIG. 17 illustrates the routing logic associated with the routing algorithm in the first scenario for facilitating predictive intent-based routing within self-adjusted service levels, in accordance with some embodiments.

FIG. 16 and FIG. 17 depicts a scenario where CWT+PWT<ASL

Further, a customer with chat nr 100 in a queue is waiting for 8 seconds while her Adjusted Service Level (ASL) on the right-hand side is calculated to be 9 seconds. As agent 400 is idle (with PWT=0), the chat will be routed to agent 400.

Further, a customer with chat nr 102 in the queue is waiting for 7 seconds while her ASL is 9 seconds. The PWT for the optimal agent 401 is 1.5 seconds. Hence the chat will be routed to agent 401. The chat is transferred within the ASL of 9 seconds.

Figure 18:
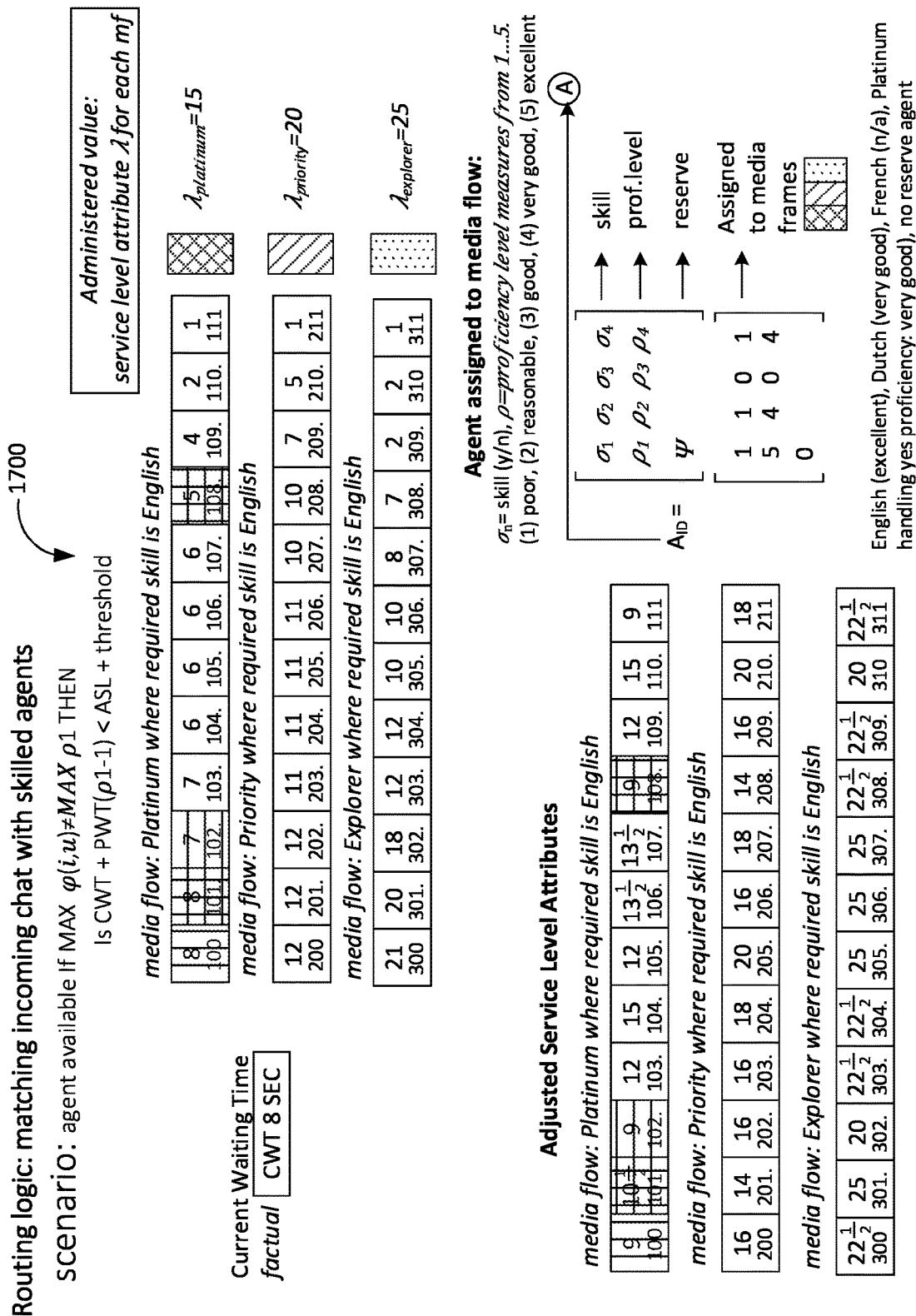
FIG. 18 illustrates a routing logic associated with the routing algorithm in a second scenario for facilitating predictive intent-based routing within self-adjusted service levels, in accordance with some embodiments.
Figure 19:
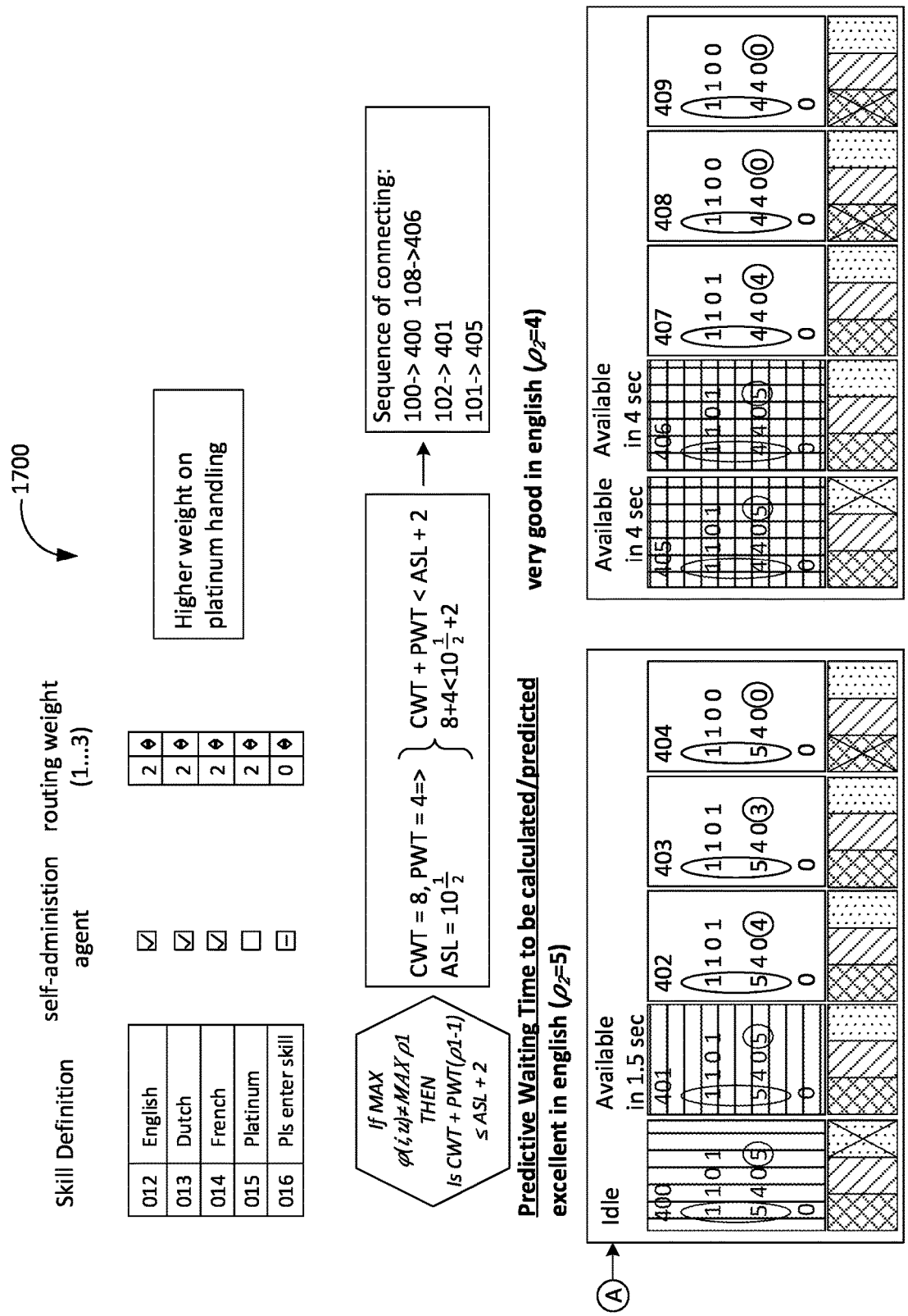
FIG. 19 illustrates the routing logic associated with the routing algorithm in the second scenario for facilitating predictive intent-based routing within self-adjusted service levels, in accordance with some embodiments.

FIG. 18 and FIG. 19 depict a scenario where CWT+PWT>ASL. Further, a step may be evaluated where "If MAX $\varphi(i,u) \neq$ MAX $\rho1$ THEN "Is CWT+PWT($\rho1-1$)<ASL+threshold"

The goal is to maintain the highest match between $\varphi(i,u)$ and the proficiency levels of the agent's skill sets. However, when this is not feasible and the CWT+PWT exceeds the ASL value, the weight of the skill may be taken into consideration. In other words, it will first optimize the maximum value of $\varphi(i,u)$ with the maximum value of proficiency levels within the relevant skillsets and will search for an agent (in order to match the above formula) with one lower proficiency level of the skill with the lowest weight-value. This is done to optimize the matching of the highest value of $\varphi(i,u)$ with the highest proficiency level of the most relevant skill.

Considering, the $\varphi(i,u)$ factor in this example has the highest factor based on intent classification and customer profile classification. Further, a customer with chat nr 101 in a queue is waiting for 8 seconds while her Adjusted Service Level (ASL) on the right-hand side is calculated to be 10.5 seconds. There are no agents idle and the PWT of agents with relevant skills with the maximum proficiency levels (maximum in platinum customer handling and maximum proficiency level in English) cannot be made available within the (ASL+Threshold). It would require an agent with relevant skills in Platinum and English with the highest proficiency levels of $\rho1=5$ and $\rho4=5$. However as depicted on the left side of the bottom of FIG. 19, no such agents are available. The result is that an agent may be found to become available with a proficiency level of the least relevant skill (in this case English) which is one value below the optimum. Therefore, an agent will be found to have a PWT that fits the CWT+PWT($\rho1-1$)<ASL+threshold of 2 seconds. As agent 405 has a PWT value of 4 seconds, chat 101 will be routed to agent 405.

Figure 20:
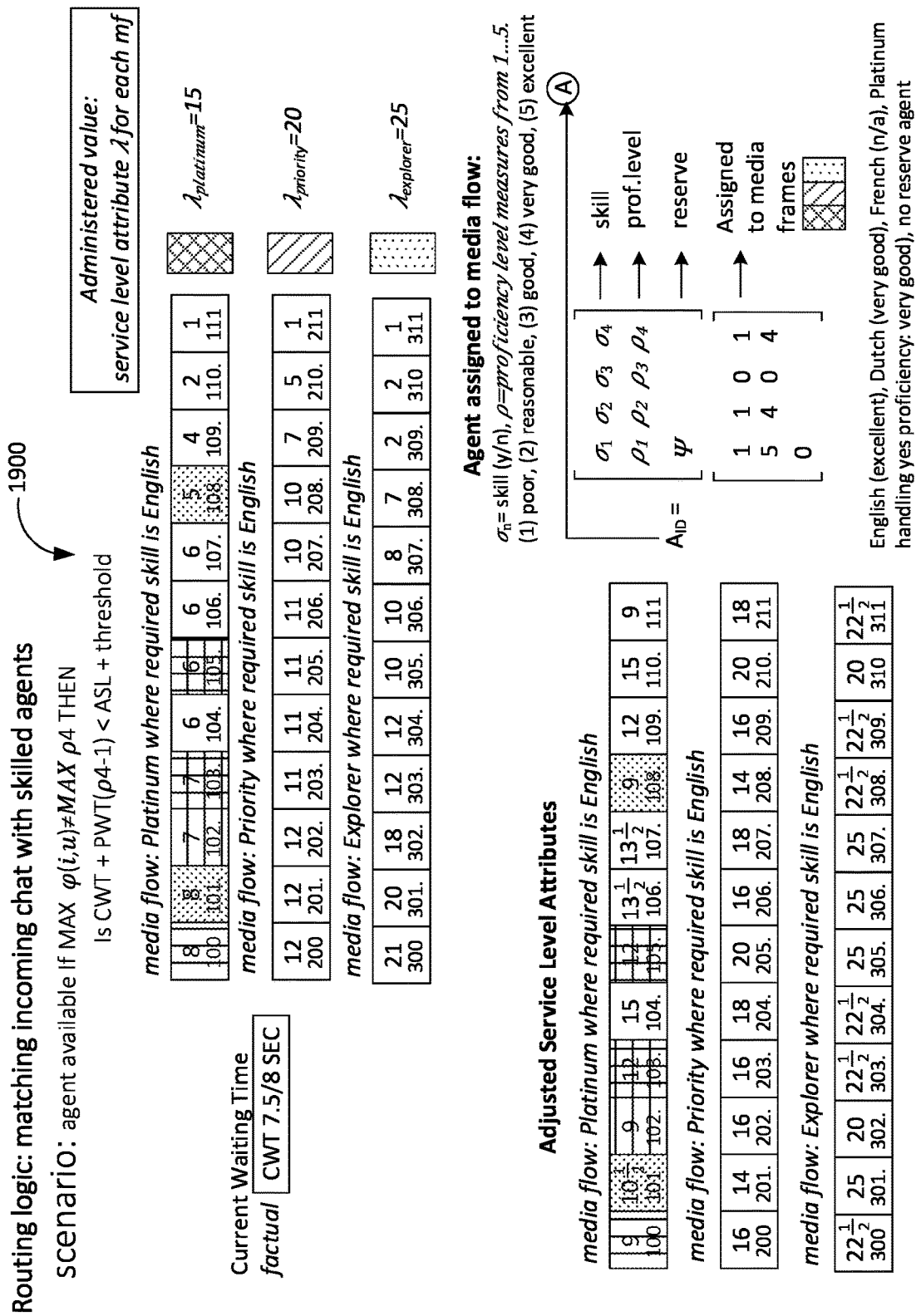
FIG. 20 illustrates a routing logic associated with the routing algorithm in a third scenario for facilitating predictive intent-based routing within self-adjusted service levels, in accordance with some embodiments.
Figure 21:
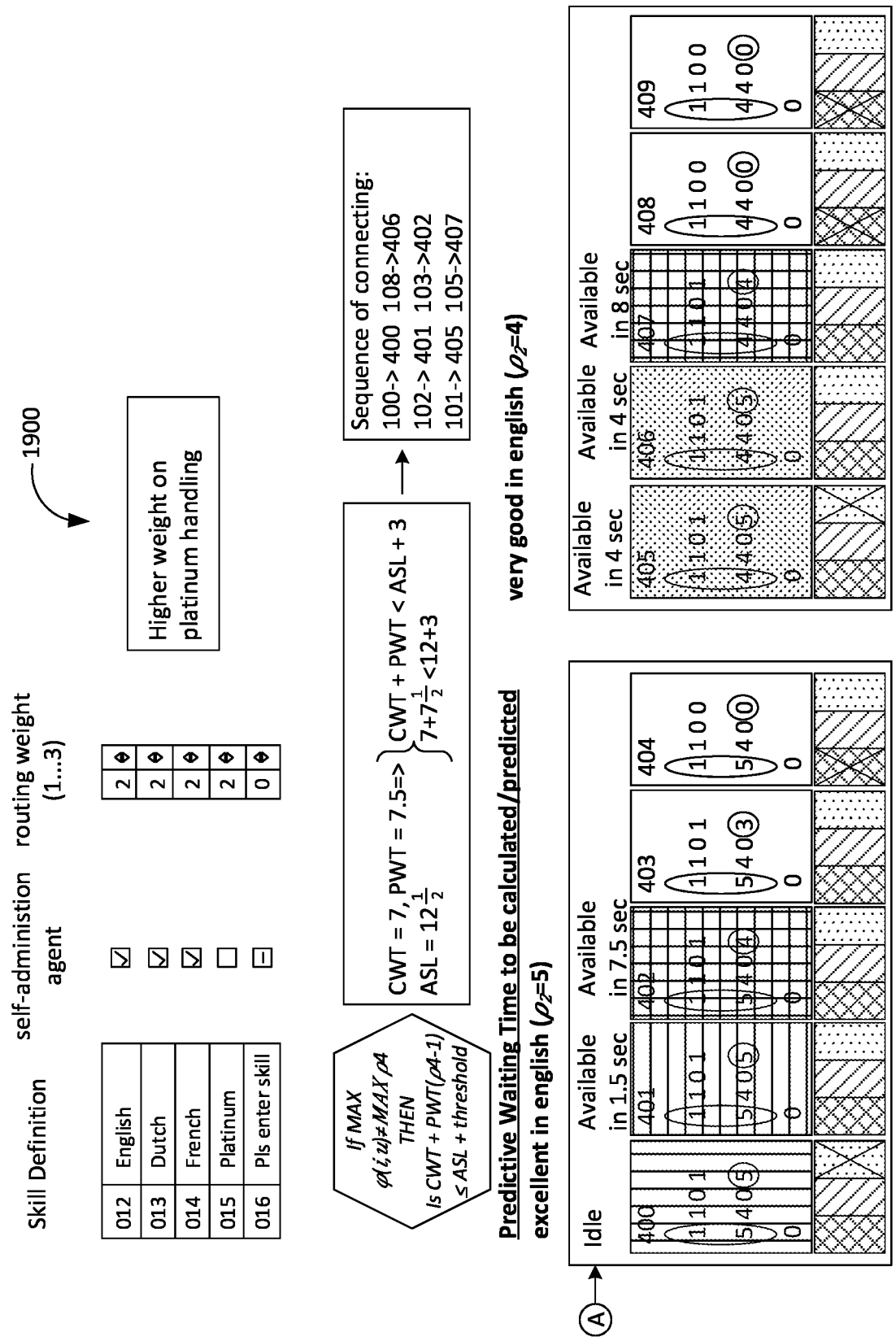
FIG. 21 illustrates the routing logic associated with the routing algorithm in the third scenario for facilitating predictive intent-based routing within self-adjusted service levels, in accordance with some embodiments.

Further, FIG. 20 and FIG. 21 depicts a scenario where CWT+PWT>ASL AND CWT+PWT($\rho1-1$)>ASL+threshold. Further, it may evaluate a step where If MAX $\varphi(i,u) \neq$ MAX $\rho4$ THEN "Is CWT+PWT($\rho4-1$)<ASL+threshold"

As explained in the previous example, the algorithm may first optimize the maximum value of $\varphi(i,u)$ with the maximum value of proficiency levels within the relevant skillsets and may search for an agent with one lower proficiency level of the skill with the lowest weight-value. However, if this is not feasible, the algorithm may explore whether a proficiency level of one value lower can be considered the skill with the highest weight (in other words the most relevant skill).

Considering, the $\varphi(i,u)$ factor in this example has the highest factor based on intent classification and customer profile classification. Further, a customer with chat nr 103 in a queue is waiting for 7 seconds while her Adjusted Service Level (ASL) on the right-hand side is calculated to be 12 seconds. There are no agents idle and the PWT of agents with relevant skills with the maximum proficiency levels (maximum in platinum customer handling and maximum proficiency level in English) cannot be made available within the (ASL+Threshold). Furthermore, an agent may not be made available with a proficiency level of the least relevant skill (in this case English) that is one value below the optimum. The result is that agents will be considered with a proficiency level of one level below the optimum of the most relevant skill-set (in this case Platinum). Therefore, a customer with chat 103 with an ASL value of 12 may be routed to agent 402 based on CWT+PWT($\rho4-1$)<ASL+threshold of 3 seconds.

The next level down is to match the highest value of $\varphi(i,u)$ with an agent with skills platinum and English with proficiency levels of 1 level below the maximum. This is depicted in the diagram with chat nr 105 being routed to agent 407.

Further, the disclosed system may be configured for the creation of an optimum chatbot usage and live interaction based on intents, entities, and training sets from the bot. Further, the disclosed system may be configured for routing chats and/or calls based on agent status and availability by using thresholds and weight of skills and Threshold for reserve agents (TRA). Further, the agent may be associated with skills and proficiency levels. Further, the disclosed system may be configured for cost optimization and maintaining customer intimacy. Further, the Adjusted Service Levels may be adjusted based on intents, entities, training sets from the bot, and a customer profile classification based on a set of rules (e.g. high-value customer is a customer who spends more than $10,000 per year).

Further, the agent or agents may be assigned with attributes such as skills, the proficiency levels of these skills, and whether they are reserve agents or not. However, the agent may be assigned with an additional attribute that may lead to a degree of adjusting service levels as an agent satisfaction indicator. For example, an energy company is forced to reduce costs because of 'high energy prices. As multiple energy companies compete for the same customer, they need to retain their customer base. As these energy companies are deploying bot technology to reduce costs, they are challenged with bot dialogues that lead to an exemplary intent such as "I want to switch to another Energy provider". Further, the exemplary 'intent' should be classified with the highest importance and urgency level in order to prioritize 'routing' but above all, the highest value of $\varphi(i,u)$—represents 'the intent to switch over to another provider' coupled with the highest customer profile classification $\delta$ needs to match with the highest value of agent attribute 'agent satisfaction indicator'. This may allow the most experienced and skilled agent to actually retain the customer.

Further, the disclosed system may emphasize the notion that 'routing' depends on 'intent classification', but also on customer profile classification. The latter is well known in the Contact Center space (e.g. companies such as Genesys, Nice, Avaya), but the uniqueness of the disclosed system is that routing is dynamically prioritized based on 'intents' derived from the bot as well. It is the combination of intents and customer profile that lead to 'adjusting service levels'.

Further, the high-value customer does not always lead to the highest priority and therefore most significant adjustment to a service level. The intent in the dialogue or (score/sentiment from the NLU) is relevant to adjusting routing as well.

Further, only transferring a recommendation may not be sufficient. Further, the transferring of the recommendation only makes sense when there is an agent available or soon available within service levels. Further, the disclosed system may be configured for matching highest value customers and most important/urgent intents with the highest proficiency levels of most relevant skills of an agent using an algorithm, prioritizing routing based on adjusted service levels (based on intents, entities, and customer profile classification), and notifying reserve agents when service levels exceed CWT+ PWT. Further, if CWT+PWT continues to exceed ASL, the lowest priority intents may be declassified in order to keep the chat within the bot for a certain period of time (or ADI-time: automatic declassification of intents).

Further, the disclosed system may be configured for generating a transferring recommendation based on parameters from the NLU. Further, the parameters may include a 'score'—the intent to which the NLU understands the 'human being' and a 'sentiment score' which reflects the emotion in the bot dialogue.

Further, proficiency of agent skill may be calculated based on multi skills. Further, the disclosed system may route a chat to the agent with skill. Further, the disclosed system may be configured for customer profile classification and intent classification from the bot. Further, in an instance, while talking to an energy provider in Europe with prices going through roof, a customer may want to reduce costs. Further, some companies may apply the bot so the customers have to navigate very basic prompts first. But VIP clients or those with complicated queries may not be handled by a bot. Further, the bot cannot comprehend intent such as frustration/panic. Further, the bot cannot comprehend the need for an obscure task not easily explained to the bot. Further, the disclosed system may make bots smarter and provide answers, and connect through natural language understanding based on conversational AI. Further, the disclosed system may be configured to transfer a call or chat more like an intelligent router where the intent/importance of the customer prioritizes routing. Further, the bot may recognize sentiment scores such as emotion based on language interpretation. Further, the disclosed system may calculate the predicted wait time and compare it with a service level that gets adjusted for the customer. Further, the bot may calculate a prediction score as the ability for the bot to understand humans. Further, the disclosed system may use the sentiment score and the prediction score for routing purposes in calls based on input to the bot.

Further, the disclosed system may be configured for selection of the agent based on predicted wait time divided by adjusted service level (combination of sentiment/prediction scores+customer profile classification). Further, the disclosed system may route calls based on some baseline value "1" where people stay waiting/talking to the bot unless priority becomes high enough. Further, the disclosed system leaves the agent available for the calls with lower priority intent and still keeps the chat in the queue. Further, the priority of the chat can change during the conversation. Further, the disclosed system may be configured for manual classification to transfer the call. Further, the disclosed system may be configured for automatic classification/declassification. Further, the disclosed system may use the bot as IVR. Further, if someone doesn't want to talk to the bot, the user may say "I have a question and prefer to talk to an individual" and based on intent, routing may be done based on variables. Further, in most cases it is sort of like a handshake between the nucleus where the algorithm fits, so even if the user wants to transfer chat, the nucleus/algorithm may still accept the chat. Further, the reserve agents may log in if the predicted wait time exceeds a threshold level. Further, the reserve agents may work for the company but in another capacity, or may be on-call and employed doing something else in off-hours. Further, the disclosed system may allow informal agents like knowledge workers at the company to be accessible under certain circumstances (e.g. a user claiming to take things 'legal' might get directly routed to a knowledge worker who can offer 'legal assistance'. This knowledge worker would usually not take chats/calls within a formal contact center.

FIG. 1 is an illustration of an online platform 100 consistent with various embodiments of the present disclosure. By way of non-limiting example, the online platform 100 for facilitating predictive intent-based routing of service requests may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
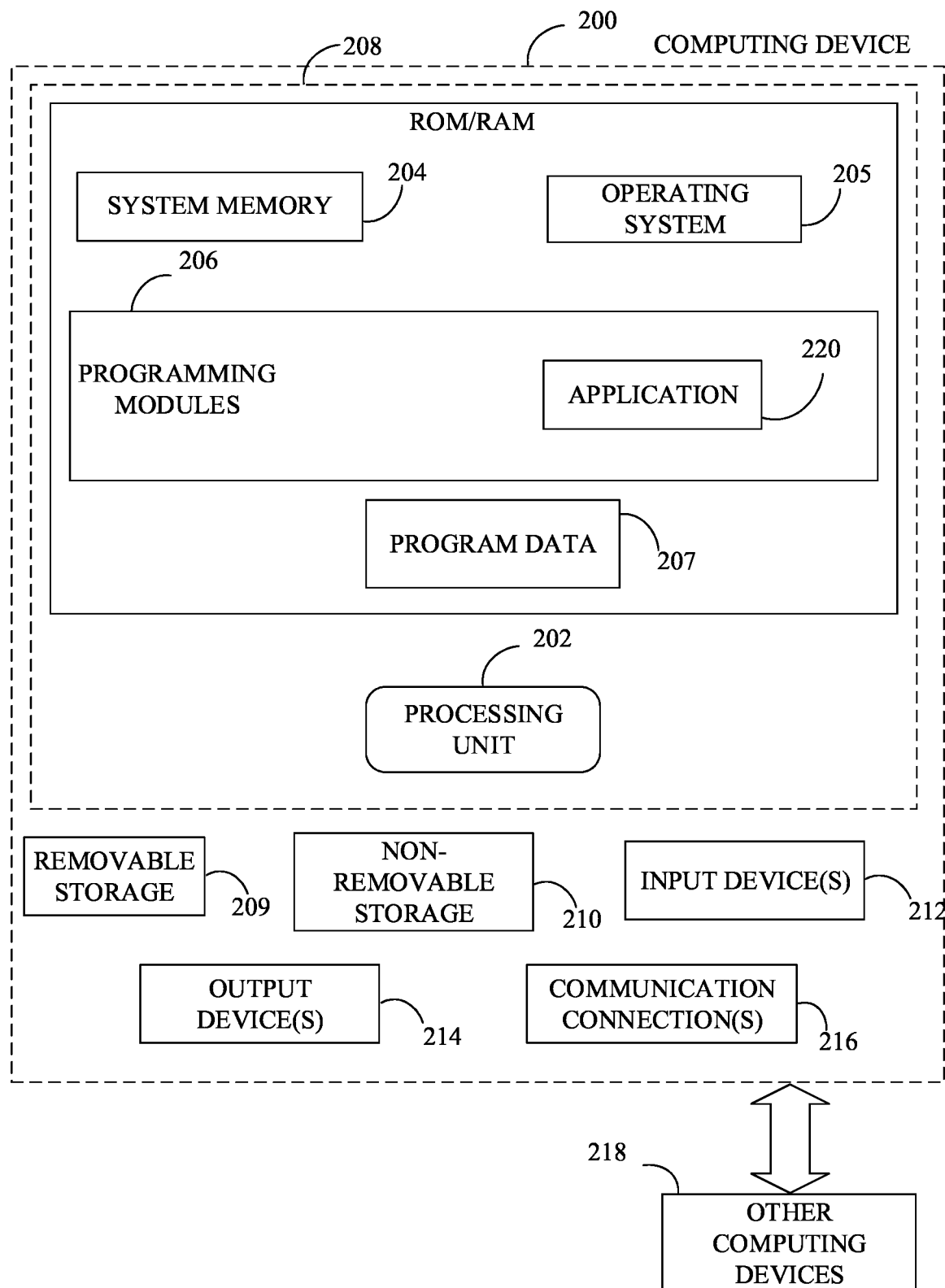
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
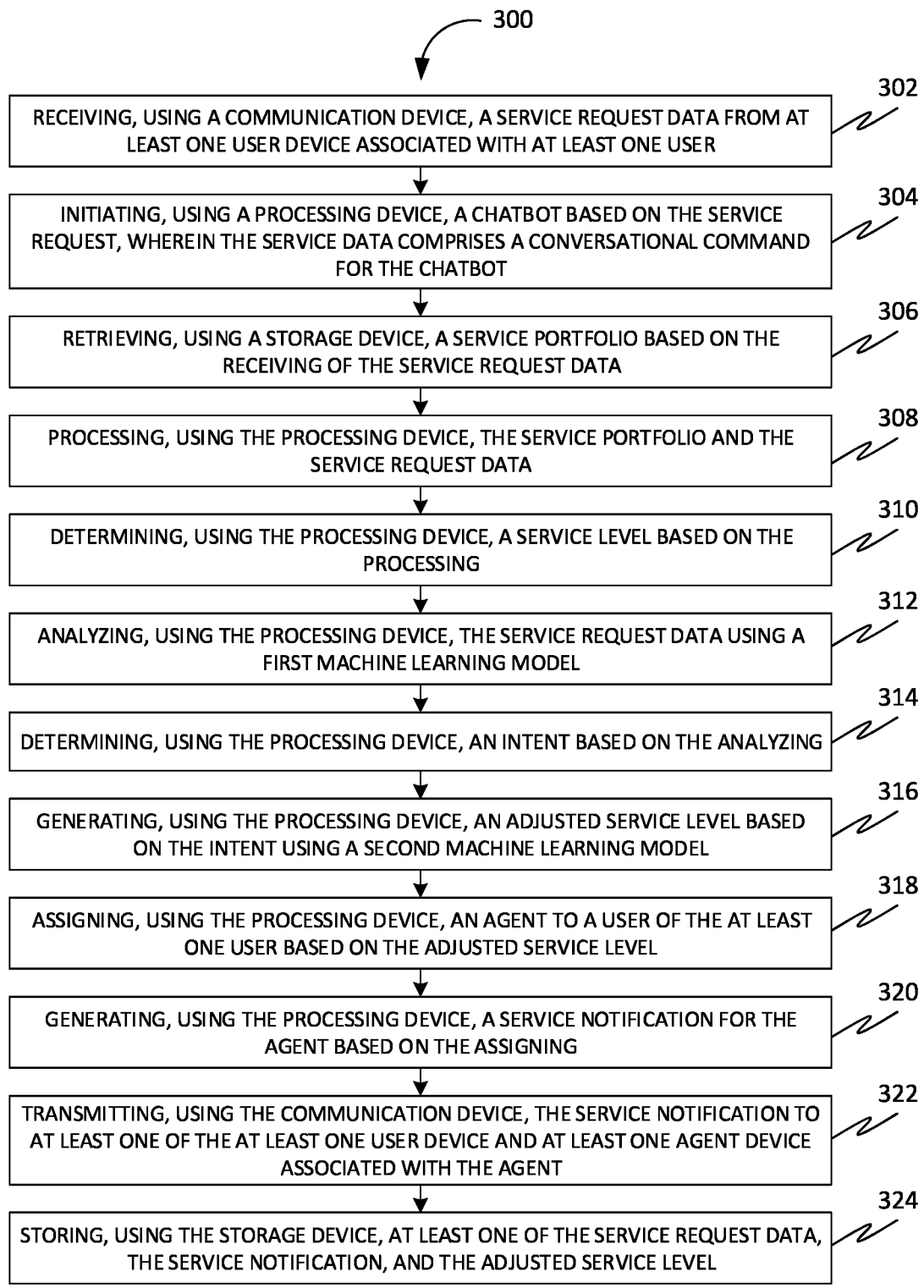
FIG. 3 is a flowchart of a method of facilitating predictive intent-based routing of service requests, in accordance with some embodiments.

FIG. 3 is a flowchart of a method 300 of facilitating predictive intent-based routing of service requests, in accordance with some embodiments. Accordingly, at 302, the method 300 may include receiving, using a communication device (such as a communication device 802), a service request data from at least one user device (such as at least one user device 902) associated with at least one user. Further, the service request data may include a service request for receiving at least one service for at least one issue faced by the at least one user and a service data. Further, the at least one user device may include a smartphone, a tablet, a laptop, a computer, and so on.

Further, at 304, the method 300 may include initiating, using a processing device (such as a processing device 804), a chatbot based on the service request. Further, the service data may include a conversational command for the chatbot.

Further, at 306, the method 300 may include retrieving, using a storage device (such as a storage device 806), a service portfolio based on the receiving of the service request data. Further, the service portfolio defines a priority of the service request based on basic service levels.

Further, at 308, the method 300 may include processing, using the processing device, the service portfolio and the service request data.

Further, at 310, the method 300 may include determining, using the processing device, a service level based on the processing. Further, the service level represents a time for the service request to be answered.

Further, at 312, the method 300 may include analyzing, using the processing device, the service request data using a first machine learning model.

Further, at 314, the method 300 may include determining, using the processing device, an intent based on the analyzing.

Further, at 316, the method 300 may include generating, using the processing device, an adjusted service level based on the intent using a second machine learning model. Further, the second machine learning model may be trained for adjusting the service level based on the classifying the intent for generating the adjusted service level.

Further, at 318, the method 300 may include assigning, using the processing device, an agent to a user of the at least one user based on the adjusted service level. Further, the agent provides the at least one service to the at least one user.

Further, at 320, the method 300 may include generating, using the processing device, a service notification for the agent based on the assigning.

Further, at 322, the method 300 may include transmitting, using the communication device, the service notification to at least one of the at least one user device and at least one agent device (such as at least one agent device 904) associated with the agent. Further, the at least one agent device may include a smartphone, a tablet, a laptop, a computer, and so on.

Further, at 324, the method 300 may include storing, using the storage device, at least one of the service request data, the service notification, and the adjusted service level.

Further, the classifying the intent may include prioritizing and sequencing the intent relative to intent from other users. Further, the prioritizing and sequencing of the intent may be performed for the at least one user to receive the at least service by the agent.

Further, in some embodiments, the service request data may include a profile classification data associated with the at least one user. Further, the profile classification data indicates priority ranking of the at least one user based on a user profile. Further, the generating of the adjusted service level may be based on the profile classification data. Further, the user profile may include a silver profile, gold profile, platinum profile, etc. Further, the at least one user may provided with privilege of receiving the at least one service before other users based on the user profile. Further, in an instance, a first user of the at least one user with a platinum profile may be provided service by the agent before a second user of the at least one user with the silver profile.

Further, in some embodiments, the method 300 may include determining, using the processing device, a service proficiency level corresponding to the at least one user based on the adjusted service level. Further, the assigning of the agent may be based on the proficiency level of the relevant skill of the service agent. Further, the assigning of the agent may include assigning the agent possessing relevant skills characterized by the service proficiency level. Further, the agent may provide the at least one service of a quality grade equivalent to the service proficiency level to the at least one user.

Further, in some embodiments, the at least one user may include a first user and a second user. Further, a user profile of the first user may be higher than a user profile of the second user. Further, the agent may include a first agent assigned for providing the at least one service to the first user at a first service proficiency level and a second agent assigned for providing the at least one service to the second user at a second service proficiency level. Further, the first service proficiency level may be higher than the second service proficiency level.

Further, in some embodiments, the intent may include a pre-populated intent characterized by a highest priority. Further, in an instance, the pre-populated intent may be a critical situation such as a customer threatening to switch service providers. This includes intents and utterances which do not immediately lead to a request for a human hand-over, bur are considered important for an agent to intervene (e.g. a customer, who expresses to switch over to another provider, does not explicitly asks for an agent to take over the conversation from the bot, but it is prudent from an overall customer experience perspective to directly connect the customer with high priority to an agent with a high proficiency in retaining customers). Further, the generating of the adjusted service level may be based on the pre-populated intent. Further, in an embodiment, the assigning of the agent is based on the pre-populated intent. Further, the service request with the pre-populated intent may be directly assigned to the agent for providing the at least one service.

Figure 4:
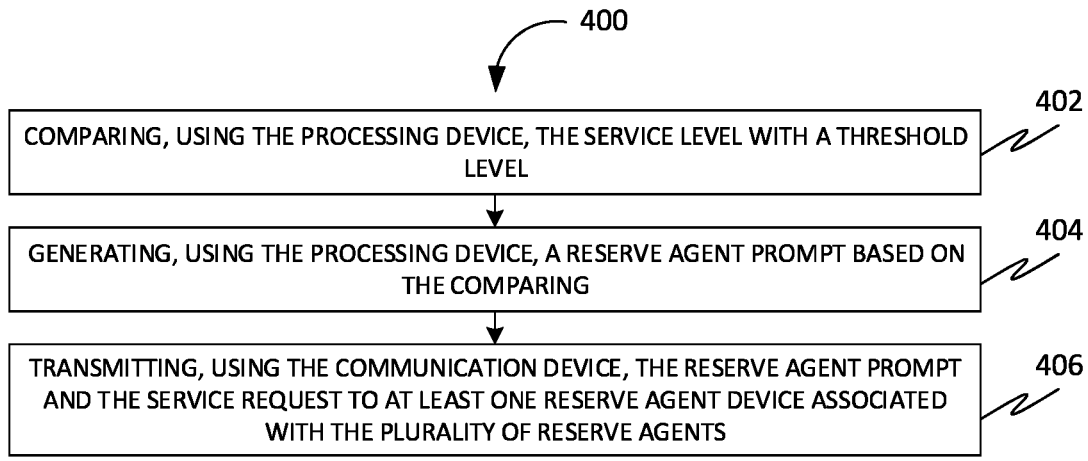
FIG. 4 is a flowchart of a method of facilitating predictive intent-based routing of service requests, in accordance with some embodiments.

FIG. 4 is a flowchart of a method 400 of facilitating predictive intent-based routing of service requests, in accordance with some embodiments. Accordingly, at 402, the method 400 may include comparing, using the processing device, the service level with a threshold level.

Further, at 404, the method 400 may include generating, using the processing device, a reserve agent prompt based on the comparing. Further, the reserve agent prompt indicates a requirement of a plurality of reserve agents for providing the service.

Further, at 406, the method 400 may include transmitting, using the communication device, the reserve agent prompt and the service request to a plurality of reserve agent devices associated with the plurality of reserve agents. Further, the plurality of reserve agents may be an agent with a pre-defined skill that may provide the at least one service.

Figure 5:
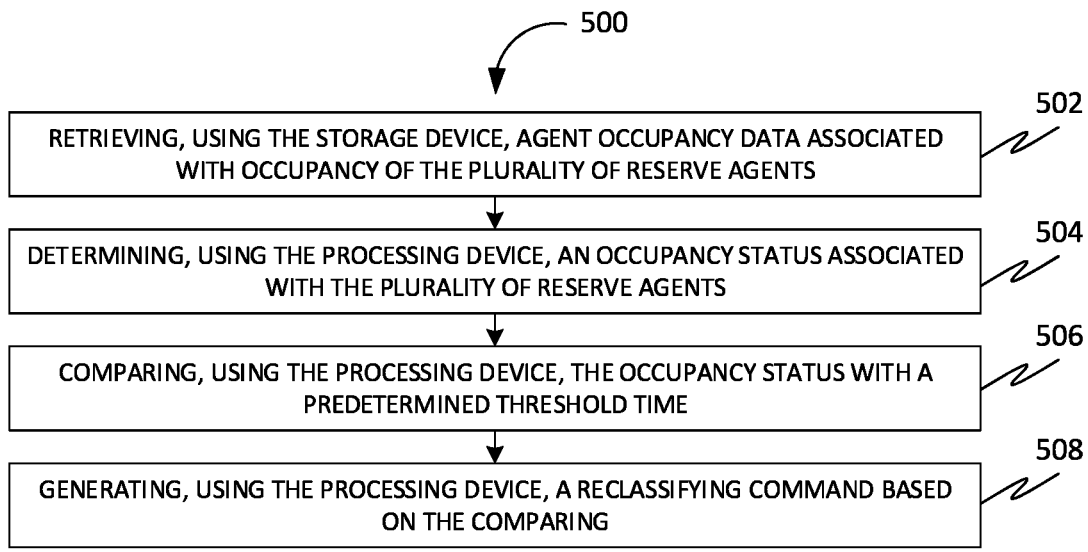
FIG. 5 is a flowchart of a method of facilitating predictive intent-based routing of service requests, in accordance with some embodiments.

FIG. 5 is a flowchart of a method 500 of facilitating predictive intent-based routing of service requests, in accordance with some embodiments. Accordingly, at 502, the method 500 may include retrieving, using the storage device, agent occupancy data associated with occupancy of the plurality of reserve agents.

Further, at 504, the method 500 may include determining, using the processing device, an occupancy status associated with the plurality of reserve agents. Further, the occupancy status may include an occupancy time displaying insufficiency of the plurality of reserve agents to provide the at least one service. Further, the occupancy status indicates that agent capacity associated with the plurality of reserve agents remains insufficient to provide the at least one service for the occupancy time. Further, the occupancy time may be a time period for which the plurality of reserve agents was insufficient to provide the at least one service to the at least one user.

Further, at 506, the method 400 may include comparing, using the processing device, the occupancy status with a predetermined threshold time.

Further, at 508, the method 500 may include generating, using the processing device, a reclassifying command based on the comparing. Further, the second machine learning model may be configured for reclassifying the intent based on the reclassifying command. Further, the assigning of the agent may be based on the reclassifying. Further, the reclassifying of the intent may include altering, prioritizing, and sequencing of the service request associated with the intent to be answered by the agent. In fact, the sequence diagram leads to 'keeping the chats' in the bot (i.e. a declassified intent) in the event that service levels have been exceeded and the pool of reserve agents is insufficient to increase the agent pool (in order to lower PWT).

Figure 6:
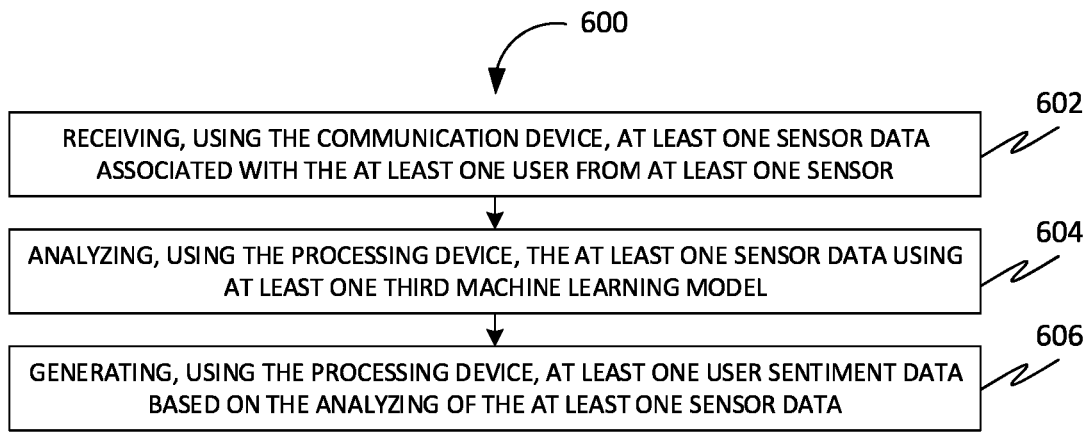
FIG. 6 is a flowchart of a method of facilitating predictive intent-based routing of service requests, in accordance with some embodiments.

FIG. 6 is a flowchart of a method 600 of facilitating predictive intent-based routing of service requests, in accordance with some embodiments. Accordingly, at 602, the method 600 may include receiving, using the communication device, at least one sensor data associated with the at least one user from at least one sensor (such as at least one sensor 1002). Further, the at least one sensor may include an image sensor, an audio sensor, a motion sensor, a thermal sensor, etc.

Further, at 604, the method 600 may include analyzing, using the processing device, the at least one sensor data using at least one third machine learning model.

Further, at 606, the method 600 may include generating, using the processing device, at least one user sentiment data based on the analyzing of the at least one sensor data. Further, the generating of the adjusted service level may be based on the at least one user sentiment data.

Further, in some embodiments, the at least one sensor may include an image sensor configured for generating the at least one sensor data based on detecting physical movements of the al least one user.

Further, in some embodiments, the at least one user device may include the at least one sensor such as an image sensor, an audio sensor, etc.

Further, in some embodiments, the at least one sensor may include at least one physiological sensor configured for generating the at least one sensor data based on detecting at least one physiological parameter of the at least one user.

Figure 7:
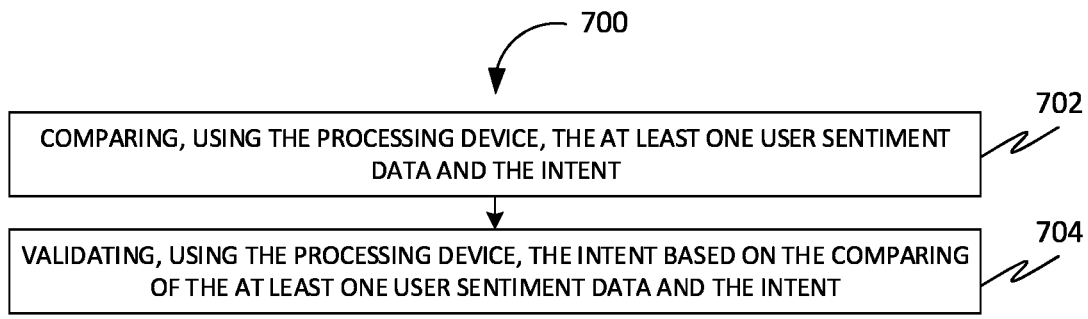
FIG. 7 is a flowchart of a method of facilitating predictive intent-based routing of service requests, in accordance with some embodiments.

FIG. 7 is a flowchart of a method 700 of facilitating predictive intent-based routing of service requests, in accordance with some embodiments. Accordingly, at 702, the method 700 may include comparing, using the processing device, the at least one user sentiment data and the intent. Further, at 704, the method 700 may include validating, using the processing device, the intent based on the comparing of the at least one user sentiment data and the intent. Further, the validating may include checking if the intent determined by the first machine learning is correct. Further, the determining of the intent may be based on the validating.

Further, in some embodiments, the method 700 may include generating, using the processing device, a validation alert based on the validating. Further, the validation alert may include a positive validation and a negative validation. Further, the positive validation may indicate correct determining of the intent. Further, the negative validation may indicate incorrect determining of the intent.

Further, in some embodiments, the method 700 may include generating, using the processing device, an observational intent corresponding to the intent based on the at least one user sentiment data. Further, the generating of the adjusted service level may be based on the observational intent.

Figure 8:
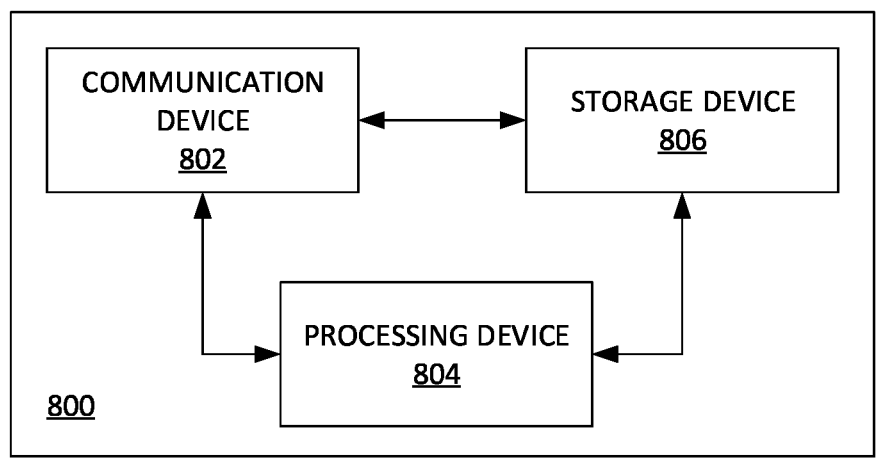
FIG. 8 is a block diagram of a system of facilitating predictive intent-based routing of service requests, in accordance with some embodiments.
Figure 9:
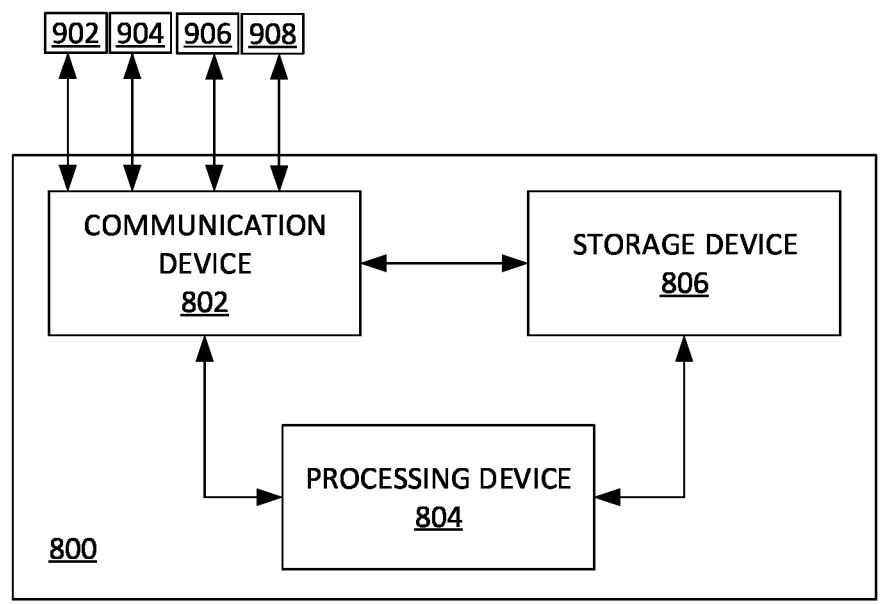
FIG. 9 is a block diagram of the system of facilitating predictive intent-based routing of service requests, in accordance with some embodiments.

FIG. 8 is a block diagram of a system 800 of facilitating predictive intent-based routing of service requests, in accordance with some embodiments. Accordingly, the system 800 may include a communication device 802 configured for receiving a service request data from at least one user device 902 (as shown in FIG. 9) associated with at least one user.

Further, the service request data may include a service request for receiving at least one service for at least one issue faced by the at least one user and a service data. Further, the communication device 802 may be configured for transmitting a service notification to at least one of the at least one user device 902 and at least one agent device 904 (as shown in FIG. 9) associated with the agent.

Further, the system may include a processing device 804 communicatively coupled with the communication device 802. Further, the processing device 804 may be configured for initiating a chatbot based on the service request. Further, the service data may include a conversational command for the chatbot. Further, the processing device 804 may be configured for processing the service portfolio and the service request data. Further, the processing device 804 may be configured for determining a service level based on the processing. Further, the service level represents a time for the service request to be answered. Further, the processing device 804 may be configured for analyzing the service request data using a first machine learning model. Further, the processing device 804 may be configured for determining an intent based on the analyzing. Further, the processing device 804 may be configured for generating an adjusted service level based on the intent using a second machine learning model. Further, the second machine learning model may be trained for adjusting the service level based on the classifying the intent for generating the adjusted service level. Further, the processing device 804 may be configured for assigning an agent to a user of the at least one user based on the adjusted service level. Further, the agent provides the at least one service to the at least one user. Further, the processing device 804 may be configured for generating the service notification for the agent based on the assigning.

Further, the system may include a storage device 806 communicatively coupled with the communication device 802. Further, the storage device 806 may be configured for retrieving the service portfolio based on the receiving of the service request data. Further, the service portfolio defines a priority of the service request based on basic service levels. Further, the storage device 806 may be configured for storing at least one of the service request data, the service notification, and the adjusted service level.

Further, in some embodiments, the processing device 804 may be configured for comparing the service level with a threshold level. Further, the processing device 804 may be configured for generating a reserve agent prompt based on the comparing. Further, the reserve agent prompt indicates a requirement of a plurality of reserve agents for providing the service. Further, the communication device 802 may be configured for transmitting the reserve agent prompt and the service request to a plurality of reserve agent devices 906-908 (as shown in FIG. 9) associated with the plurality of reserve agents.

Further, in some embodiments, the storage device 806 may be configured for retrieving agent occupancy data associated with occupancy of the plurality of reserve agents. Further, the processing device 804 may be configured for determining an occupancy status associated with the plurality of reserve agents. Further, the occupancy status may include an occupancy time displaying insufficiency of the plurality of reserve agents to provide the at least one service. Further, the occupancy time may be a time period for which the plurality of reserve agents was insufficient to provide the at least one service to the at least one user. Further, the processing device 804 may be configured for comparing the occupancy status with a predetermined threshold time. the processing device 804 may be configured for generating a reclassifying command based on the comparing. Further, the second machine learning model may be configured for reclassifying the intent based on the reclassifying command. Further, the assigning of the agent may be based on the reclassifying.

Figure 10:
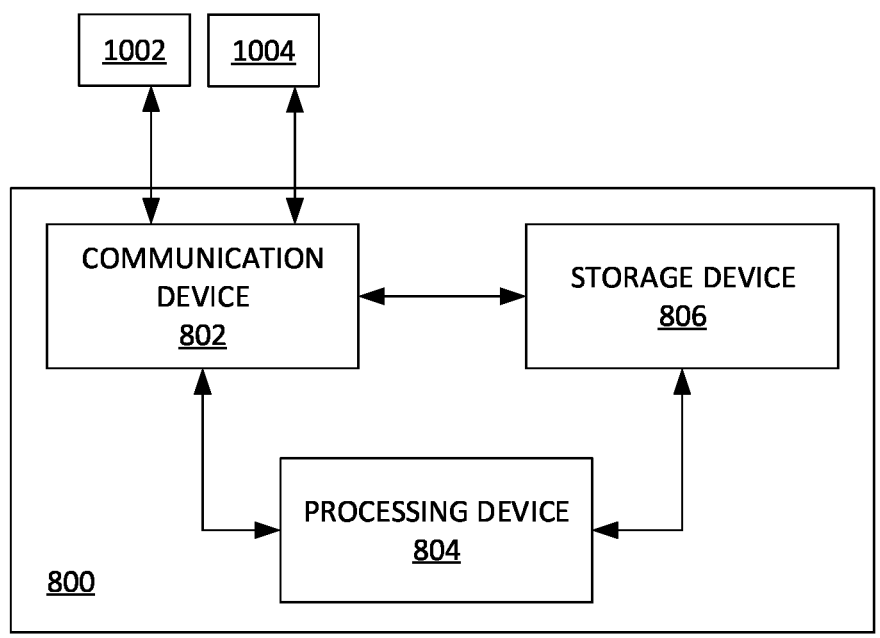
FIG. 10 is a block diagram of the system of facilitating predictive intent-based routing of service requests, in accordance with some embodiments.

Further, in some embodiments, the communication device 802 may be configured for receiving at least one sensor data associated with the at least one user from at least one sensor 1002 (as shown in FIG. 10). Further, the processing device 804 may be configured for analyzing the at least one sensor data using at least one third machine learning model. the processing device 804 may be configured for generating at least one user sentiment data based on the analyzing of the at least one sensor data. Further, the generating of the adjusted service level may be based on the at least one user sentiment data.

Further, in some embodiments, the at least one sensor 1002 may include an image sensor configured for generating the at least one sensor data based on detecting physical movements of the al least one user.

Further, in some embodiments, the at least one sensor 1002 may include at least one physiological sensor configured for generating the at least one sensor data based on detecting at least one physiological parameter of the at least one user.

Further, in some embodiments, the processing device 804 may be configured for comparing the at least one user sentiment data and the intent. Further, the processing device 804 may be configured for validating the intent based on the comparing of the at least one user sentiment data and the intent. Further, the determining of the intent may be based on the validating.

Further, in some embodiments, the service request data may include a profile classification data associated with the at least one user. Further, the profile classification data indicates priority ranking of the at least one user based on a user profile. Further, the generating of the adjusted service level may be based on the profile classification data.

Further, in some embodiments, the processing device 804 may be configured for determining a service proficiency level corresponding to the at least one user based on the adjusted service level. Further, the assigning of the agent may be based on the service proficiency level. Further, the assigning the agent may include assigning the agent possessing relevant skills of the service proficiency level for providing the at least one service to the at least one user.

Further, in some embodiments, the at least one user may include a first user and a second user. Further, a user profile of the first user may be higher than a user profile of the second user. Further, the agent may include a first agent assigned for providing the at least one service to the first user at a first service proficiency level and a second agent assigned for providing the at least one service to the second user at a second service proficiency level. Further, the first service proficiency level may be higher than the second service proficiency level.

FIG. 9 is a block diagram of the system 800 of facilitating predictive intent-based routing of service requests, in accordance with some embodiments.

FIG. 10 is a block diagram of the system 800 of facilitating predictive intent-based routing of service requests, in accordance with some embodiments.

Figure 11:
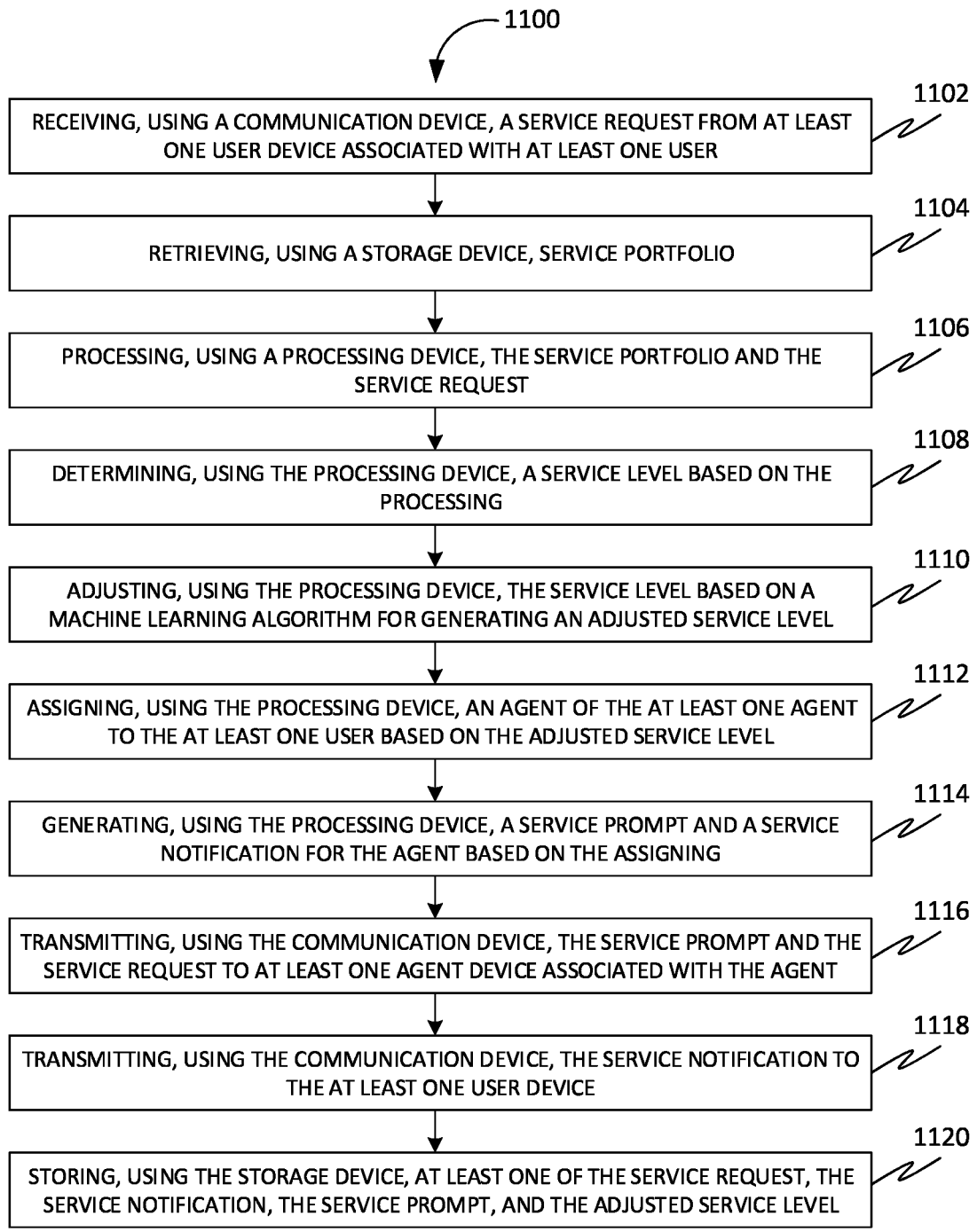
FIG. 11 is a flow chart of a method for facilitating predictive intent-based routing within self-adjusted service levels, in accordance with some embodiments.

FIG. 11 is a flow chart of a method 1100 for facilitating predictive intent-based routing within self-adjusted service levels, in accordance with some embodiments. Further, at 1102, the method 1100 may include receiving, using a communication device, a service request from at least one user device associated with at least one user. Further, the service request may include a query and user details. Further, the query may include details such as an issue faced. Further, the user details may include a user name, an email address, a contact number, an address, etc. Further, the at least one user device may include a smartphone, a mobile, a laptop, a personal computer, etc. Further, the at least one user may include an individual, an institution, and an organization that may want to receive a service for the service request. Further, the service may be associated with a query or issue faced by the at least one user. Further, the service may include a chat, voice call, or video call that may be answered by at least one agent that may resolve the query. Further, the service request may include intent from a chatbot. Further, the intent may be associated with an intent classifier.

Further, at 1104, the method 1100 may include retrieving, using a storage device, service portfolio.

Further, at 1106, the method 1100 may include processing, using a processing device, the service portfolio and the service request. Further, the service portfolio may facilitate defining a priority of the service request based on basic service levels. Further, the basic service levels may be measured in seconds.

Further, at 1108, the method 1100 may include determining, using the processing device, a service level based on the processing.

Further, at 1110, the method 1100 may include adjusting, using the processing device, the service level based on a machine learning algorithm for generating an adjusted service level. Further, the machine learning algorithm may automatically adjust intent classification through probabilities in natural language understanding from multiple NLU libraries.

Further, at 1112, the method 1100 may include assigning, using the processing device, an agent of the at least one agent to the at least one user based on the adjusted service level. For instance, in a conversational AI application for an airline, a customer is identified as a platinum customer with an urgent need to talk to a live agent as he missed his flight and has a desire to have a live agent intervene. Platinum users may have been assigned a service level objective of 10 seconds for 'live chat, but because the intent "miss flight" is urgent, the intent classifier generates a value of 40%, which will lead to a reduction of the pre-defined service level from 10 seconds to 6 seconds. The result is that these chat sessions will be transferred to a live agent (because of intent classification) with a higher priority (as the value of (CWT+PWT)/ASL has increased).

Further, at 1114, the method 1100 may include generating, using the processing device, a service prompt and a service notification for the agent based on the assigning.

Further, at 1116, the method 1100 may include transmitting, using the communication device, the service prompt and the service request to at least one agent device associated with the agent. Further, the at least one agent device may include a smartphone, a tablet, a laptop, a personal computer, and so on. Further, the service prompt may include a push notification that may inform the agent about the query. Further, the service prompt may allow the agent to answer an incoming call/chat for resolving the query.

Further, at 1118, the method 1100 may include transmitting, using the communication device, the service notification to the at least one user device. Further, the service notification may inform the at least one user that the agent has been assigned for resolving the query.

Further, at 1120, the method 1100 may include storing, using the storage device, at least one of the service request, the service notification, the service prompt, and the adjusted service level.

Further, in some embodiments, the assigning of the agent may include assigning the agent to the at least one user using the routing algorithm. Further, the routing algorithm may be trained to route the service request to the agent based on a routing factor (such as $r_{mf}$).

Further, in some embodiments, the method 1100 may include comparing, using the processing device, the adjusted service level with a threshold level based on an algorithm. Further, the algorithm may be configured for determining whether (CWT+PWT) has exceeded the value of (ASL+TRA). Further, the method 1100 may include generating, using the processing device, a reserve agent prompt based on the comparing. Further, the method 1100 may include transmitting, using the communication device, the reserve agent prompt and the service request to at least one reserve agent device associated with a reserve agent. Further, the at least one reserve agent device may include a smartphone, a tablet, a laptop, a personal computer, and so on. Further, the reserve agent prompt may inform the reserve agent about the query. Further, the reserve agent may be an agent with a pre-defined skill that may solve the query.

Figure 12:
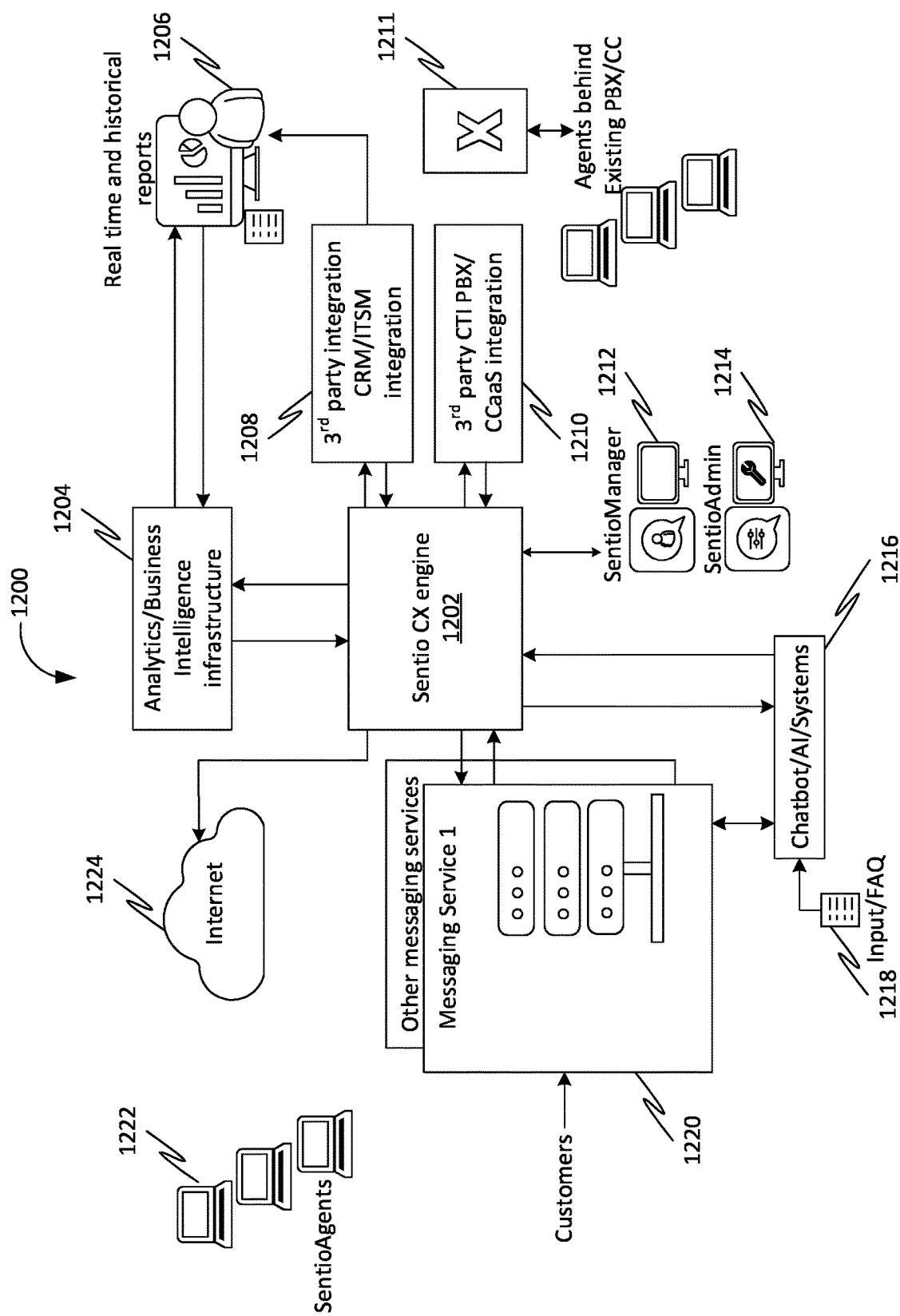
FIG. 12 is a schematic of a system for facilitating predictive intent-based routing within self-adjusted service levels, in accordance with some embodiments.

FIG. 12 is a schematic of a system 1200 for facilitating predictive intent-based routing within self-adjusted service levels, in accordance with some embodiments. Accordingly, the system 1200 may include a sentio CX engine 1202 communicatively coupled with analytics/business intelligence infrastructure 1204. Further, the analytics/business intelligence infrastructure 1204 may be associated with real-time and historical reports 1206. Further, at 1208, the sentio CX engine 1202 may be configured for performing $3^{rd}$ party integration CRM/ITSM integration. Further, at 1210, the sentio CX engine 1202 may be configured for $3^{rd}$ party CTI PBX/CCaaS integration. Further, at 1211, the system 1200 may be associated with agents behind existing PBX/CC. Further, at 1212, the sentio CX engine 1202 may be associated with a sentio manager. Further, at 1214, the sentio CX engine 1202 may be associated with a sentio admin. Further, at 1216, the sentio CX engine 1202 may be associated with chatbot/AI systems. Further, at 1218, the chatbot/AI systems may be associated with input/FAQ. Further, at 1220, the sentio CX engine 1202 may be associated with customers other messaging services. Further, at 1222, the sentio CX engine 1202 may be connected to sentio agents. Further, at 1224, the sentio CX engine 1204 may be connected to the internet.

Figure 13:
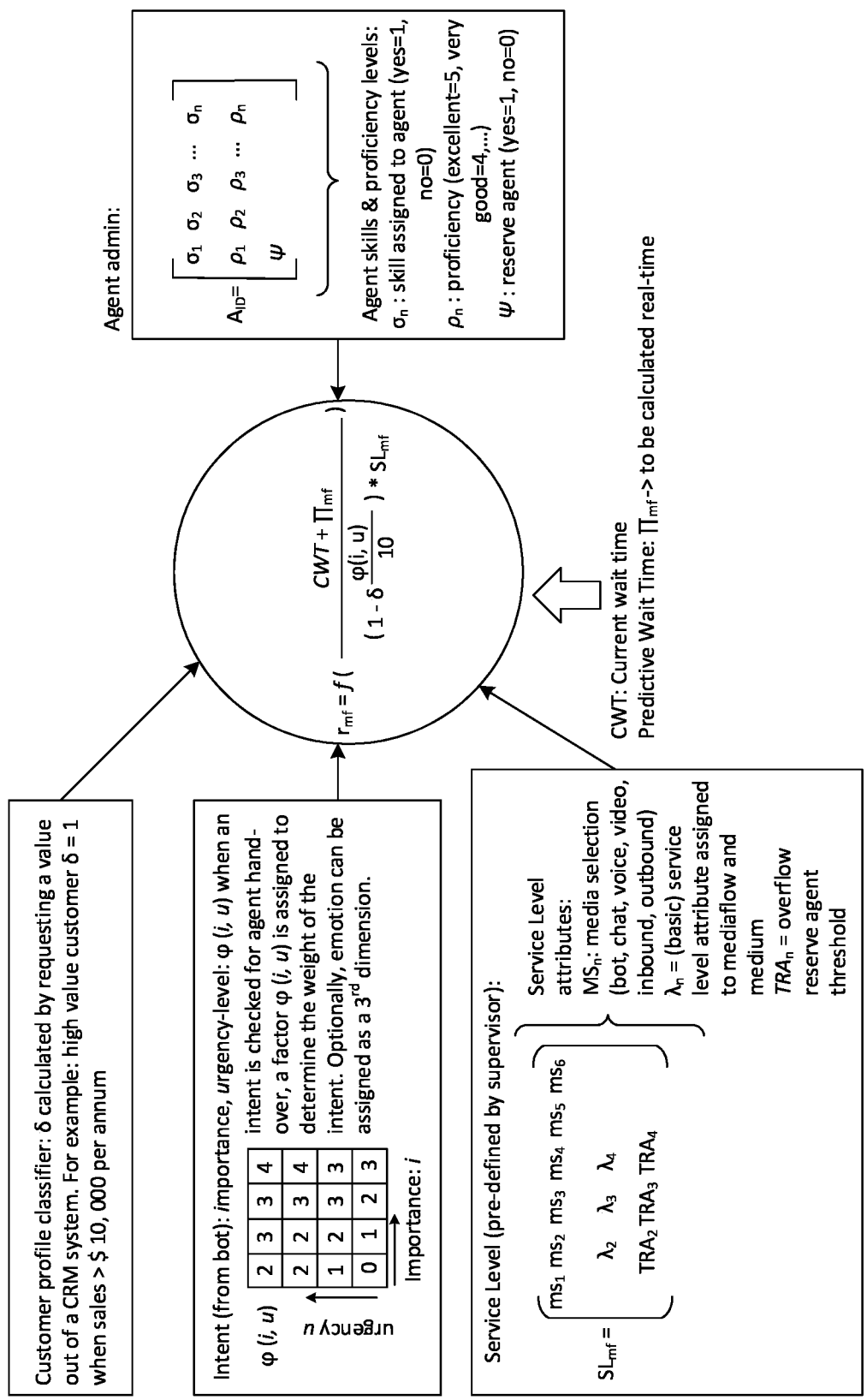
FIG. 13 illustrates calculation of a factor for the routing algorithm associated with the system for facilitating predictive intent-based routing within self-adjusted service levels, in accordance with some embodiments.

FIG. 13 illustrates a calculation of a factor for the routing algorithm associated with the system for facilitating predictive intent-based routing within self-adjusted service levels, in accordance with some embodiments.

FIG. 14 is a flow diagram of a method for facilitating predictive intent-based routing within self-adjusted service levels, in accordance with some embodiments. Accordingly, the routing algorithm may be trained to automatically adjust intent classification through probabilities in natural language understanding from multiple NLU libraries based on the factor ($r_{mf}$). Further, the routing algorithm may be configured to calculate the factor that may initiate a routing decision for the chat. Further, a customer profile classifier: δ may be calculated by requesting a value out of a CRM system. For example: high value customer δ may be 1 when sales>$10,000 per annum. Further, when an intent is checked for agent hand-over, a factor φ(i,u) is assigned to determine the weight of the intent. Optionally, emotion can be assigned as a 3rd dimension. Further, the value of the $r_{mf}$ indicates which media is to be routed. Further, Current Wait Time (CWT) and Predictive Wait Time: $\Pi_{mf}$ may be calculated real-time.

Further, the $r_{mf}$ may be calculated based on the following equation:

$$r_{mf} = f\left(\frac{CWT - \prod_{mf}}{\left(1 - \delta\frac{\varphi(i,u)}{10}\right) * SL_{mf}}\right)$$

FIG. 14 is a flow diagram of a method 1400 for facilitating predictive intent-based routing within self-adjusted service levels, in accordance with some embodiments. Accordingly, the method 1400 may be implemented by a sentio CX engine 1402. Further, at 1401, the sentio CX engine 1402 may be associated with chatbot/AI systems. Further, at 1403, the sentio CX engine 1402 may be associated with other messaging services. Further, at 1404, the method 1400 include a starting step. Further, at 1406, the method 1400 may include checking intent value ($\alpha$=1). Further, at 1407, the method 1400 may include REST API. Further, at 1408, the method 1400 may include an intent classifier. Further, the intent classifier may be $\varphi(i,u)$. Further, at 1410, the method 1400 may be associated with look up for a customer profile classifier: $\delta$. Further, at 1412, the method 1400 may include matching $\delta*\varphi(i,u)$ with $\rho_4$, $\rho1$. Further, incoming chats which may be classified for live interaction may be routed based on matching the highest value of $\delta*\varphi(i,u)$ with the highest proficiency levels related to the skillsets of the agent. Further, the weight of the proficiency levels of the individual skills $\rho_n$ (as administered in the Tenant admin tab within SentioSupervisor) is used to determine that the skill with the highest proficiency level should be matched first with the highest value of $\delta*\varphi(i,u)$.

In other words: all things being equal, a chat from IT products with high importance and high urgency will be first routed to an agent with English proficiency of 4 and IT products proficiency of 5 instead of English proficiency of 5 and IT products proficiency of 4. Further, at 1414, the method 1400 may include checking if an agent is idle. Further, if the agent is idle, at 1416, the method 1400 may send the chat to the agent that may be idle. Further, if the agent is not idle, at 1418, the method 1400 may include checking if CWT+PWT<=ASL. Further, if the CWT+PWT<=ASL holds true, then at 1420, the method 1400 may include waiting for the agent to become available. Further, at 1422, the method 1400 may include sending the chat to an available agent. Further, after 1420, at 1424, the method 1400 may include publishing a PWT message to a bot. Further, if CWT+PWT<=ASL does not hold true, at 1426, the method 1400 may include checking if CWT+PWT>ASL. Further, if CWT+PWT>ASL holds true, at 1428, the method 1400 may include checking if MAX $\varphi(i,u) \neq$ MAX $\rho_1$. Further, if MAX $\varphi(i,u) \neq$ MAX $\rho_1$ holds true, the method 1400 may include checking if CWT+PWT($\rho1-1$)<ASL+threshold. Further, if CWT+PWT($\rho1-1$)<=ASL+threshold holds true, at 1430, the method 1400 may include waiting for the agent to become available. Further, at 1432, the method 1400 may include sending the chat to the available agent. Further, after 1430, at 1434, the method 1400 may include publishing the PWT message to the bot. Further, if CWT+PWT ($\rho1-1$)<=ASL+threshold does not hold true, at 1436, the method 1400 may include checking if MAX $\varphi(i,u) \neq$ MAX $\rho_4$. Further, if MAX $\varphi(i,u) \neq$ MAX $\rho_4$ holds true, the method 1400 may include checking if CWT+PWT($\rho4-1$)<=ASL+threshold. Further, if CWT+PWT($\rho4-1$)<=ASL+threshold does not hold true, at 1438, the method 1400 may include checking if MAX $\varphi(i,u) \neq$ MAX $\rho_4$, $\rho_1$. Further, if MAX $\varphi(i,u) \neq$ MAX $\rho_4$, $\rho_1$ holds true, the method 1400 may include checking if CWT+PWT(($\rho_4-1$), ($\rho_1-1$)>ASL+$\overline{\omega}^n$ (overflow reserve agent threshold). Further, after 1438, at 1440, the method 1400 may include generating reserve agent notification and addition of reserve agents. Further, an agent pool may be expanded with $\varphi$=1. Further, after 1438, the method 1400 may proceed to 1414. Further, after 1436, if CWT+PWT($\rho4-1$)<=ASL+threshold holds true, then at 1442, the method 1400 may include waiting for the agent to become available. Further, at 1444, the method 1400 may include publishing a PWT message to the bot. Further, after 1442, at 1446, the method 1400 may include sending the chat to the available agent.

FIG. 15 is a continuation flow diagram of FIG. 14.

FIG. 16 illustrates a routing logic 1500 associated with the routing algorithm in a first scenario for facilitating predictive intent-based routing within self-adjusted service levels, in accordance with some embodiments. Accordingly, the routing logic 1500 may be associated with the first scenario where CWT+PWT<ASL.

FIG. 17 illustrates the routing logic 1500 associated with the routing algorithm in a first scenario for facilitating predictive intent-based routing within self-adjusted service levels, in accordance with some embodiments.

FIG. 18 illustrates a routing logic 1700 associated with the routing algorithm in a second scenario for facilitating predictive intent-based routing within self-adjusted service levels, in accordance with some embodiments. Accordingly, the routing logic 1700 may be associated with the second scenario where CWT+PWT>ASL. Further, a step may be evaluated where if MAX $\varphi(i,u) \neq$ MAX $\rho1$, then is CWT+PWT($\rho1-1$)<ASL+threshold.

FIG. 19 illustrates the routing logic 1700 associated with the routing algorithm in the second scenario for facilitating predictive intent-based routing within self-adjusted service levels, in accordance with some embodiments.

FIG. 20 illustrates a routing logic 1900 associated with the routing algorithm in a third scenario for facilitating predictive intent-based routing within self-adjusted service levels, in accordance with some embodiments. Accordingly, the routing logic 1900 may be associated with the third scenario where CWT+PWT>ASL and CWT+PWT($\rho1-1$)>ASL+threshold. Further, a step may be evaluated where if MAX $\varphi(i,u) \neq$ MAX $\rho4$ then checking CWT+PWT($\rho4-1$)<ASL+threshold.

FIG. 21 illustrates the routing logic 1900 associated with the routing algorithm in the third scenario for facilitating predictive intent-based routing within self-adjusted service levels, in accordance with some embodiments.

Although the present disclosure has been explained in relation to its preferred embodiment, it is to be understood that many other possible modifications and variations can be made without departing from the spirit and scope of the disclosure.

The following is claimed:

1. A method of facilitating predictive intent-based routing of service requests, the method comprising:
   receiving, using a communication device, a service request data from at least one user device associated with at least one user, wherein the service request data comprises a service request for receiving at least one service for at least one issue faced by the at least one user and a service data;

initiating, using a processing device, a chatbot based on the service request, wherein the service data comprises a conversational command for the chatbot;

retrieving, using a storage device, a service portfolio based on the receiving of the receiving of the service request data, wherein the service portfolio defines a priority of the service request based on basic service levels;

processing, using the processing device, the service portfolio and the service request data;

determining, using the processing device, a service level based on the processing, wherein the service level represents a time for the service request to be answered;

analyzing, using the processing device, the service request data using a first machine learning model;

determining, using the processing device, an intent based on the analyzing;

generating, using the processing device, an adjusted service level based on the intent using a second machine learning model, wherein the second machine learning model is trained for adjusting the service level based on the classifying the intent for generating the adjusted service level;

assigning, using the processing device, an agent to a user of the at least one user based on the adjusted service level, wherein the agent provides the at least one service to the at least one user;

generating, using the processing device, a service notification for the agent based on the assigning;

transmitting, using the communication device, the service notification to at least one of the at least one user device and at least one agent device associated with the agent;

storing, using the storage device, at least one of the service request data, the service notification, and the adjusted service level;

comparing, using the processing device, the service level with a threshold level using an algorithm;

wherein the algorithm is configured for determining whether the combination of a current waiting time and a predicted waiting time has exceeded the value of a combination of an adjusted service level and the threshold level;

wherein the predicted waiting time is calculated in real time;

generating, using the processing device, a reserve agent prompt based on the comparing, wherein the reserve agent prompt indicates a requirement of a plurality of reserve agents for providing the service;

transmitting, using the communication device, the reserve agent prompt and the service request to a plurality of reserve agent devices associated with the plurality of reserve agents;

receiving, using the communication device, at least one sensor data associated with the at least one user from at least one sensor;

analyzing, using the processing device, the at least one sensor data using at least one third machine learning model;

generating, using the processing device, at least one user sentiment data based on the analyzing of the at least one sensor data, wherein the generating of the adjusted service level is further based on the at least one user sentiment data; and wherein the generating of the adjusted service level occurs in real-time while the at least one user remains in interaction with the chatbot.

2. The method of claim 1, further comprising:

retrieving, using the storage device, agent occupancy data associated with occupancy of the plurality of agents;

determining, using the processing device, an occupancy status associated with the plurality of agents, wherein the occupancy status comprises an occupancy time displaying insufficiency of the plurality of agents to provide the at least one service;

comparing, using the processing device, the occupancy status with a predetermined threshold time;

automatically de-classifying at least one low priority intent while the occupancy status displays an insufficiency in the plurality of agents; and generating, using the processing device, a reclassifying command based on the comparing, wherein the second machine learning model is configured for reclassifying the intent based on the reclassifying command, wherein the assigning of the agent is further based on the reclassifying, and wherein the reclassifying command is issued based on the comparing when the comparing indicates a sufficiency in the plurality of agents.

3. The method of claim 1, wherein the at least one third machine learning model comprises a natural language understanding model; and wherein the at least one sensor data comprises at least one utterance of the at least one user.

4. The method of claim 1, wherein the at least one sensor comprises at least one physiological sensor configured for generating the at least one sensor data based on detecting at least one physiological parameter of the at least one user.

5. The method of claim 1 further comprising:

comparing, using the processing device, the at least one user sentiment data and the intent; and validating, using the processing device, the intent based on the comparing of the at least one user sentiment data and the intent, wherein the determining of the intent is further based on the validating.

6. The method of claim 1, wherein the service request data comprises a profile classification data associated with the at least one user, wherein the profile classification data indicates importance of the at least one user based on a user profile, wherein the generating of the adjusted service level is further based on the profile classification data.

7. The method of claim 1, wherein the method further comprises determining, using the processing device, a service proficiency level corresponding to the at least one user based on the adjusted service level, wherein the assigning of the agent is further based on the service proficiency level, wherein the assigning the agent comprises assigning the agent possessing relevant skills of the service proficiency level for providing the at least one service to the at least one user.

8. The method of claim 7, wherein the at least one user comprises a first user and a second user, wherein a user profile of the first user is higher than a user profile of the second user, wherein the agent comprises a first agent assigned for providing the at least one service to the first user at a first service proficiency level and a second agent assigned for providing the at least one service to the second user at a second service proficiency level, wherein the first service proficiency level is higher than the second service proficiency level.

9. A system of facilitating predictive intent-based routing of service requests, the system comprising:
- a communication device configured for:
  - receiving a service request data from at least one user device associated with at least one user, wherein the service request data comprises a service request for receiving at least one service for at least one issue faced by the at least one user and a service data; and
  - transmitting a service notification to at least one of the at least one user device and at least one agent device associated with the agent;
- a processing device communicatively coupled with the communication device, wherein the processing device is configured for:
  - initiating a chatbot based on the service request, wherein the service data comprises a conversational command for the chatbot;
  - processing the service portfolio and the service request data;
  - determining a service level based on the processing, wherein the service level represents a time for the service request to be answered;
  - analyzing the service request data using a first machine learning model;
  - determining an intent based on the analyzing;
  - generating an adjusted service level based on the intent using a second machine learning model, wherein the second machine learning model is trained for adjusting the service level based on the classifying the intent for generating the adjusted service level;
  - assigning an agent to a user of the at least one user based on the adjusted service level, wherein the agent provides the at least one service to the at least one user; and
  - generating the service notification for the agent based on the assigning; and
- a storage device communicatively coupled with the communication device, wherein the storage device is configured for:
  - retrieving the service portfolio based on the receiving of the receiving of the service request data, wherein the service portfolio defines a priority of the service request based on basic service levels;
  - storing at least one of the service request data, the service notification, and the adjusted service level;
  - comparing the service level with a threshold level using an algorithm;
  - wherein the algorithm is configured for determining whether the combination of a current waiting time and a predicted waiting time has exceeded the value of a combination of an adjusted service level and a threshold for reserve agents;
  - wherein the predicted waiting time is calculated in real time; and
  - generating a reserve agent prompt based on the comparing, wherein the reserve agent prompt indicates a requirement of a plurality of reserve agents for providing the service, wherein the communication device is configured for transmitting the reserve agent prompt and the service request to a plurality of reserve agent devices associated with the plurality of reserve agents,
  - wherein the communication device is configured for receiving at least one sensor data associated with the at least one user from at least one sensor, wherein the processing device is further configured for:
    - analyzing the at least one sensor data using at least one third machine learning model;
    - generating at least one user sentiment data based on the analyzing of the at least one sensor data, wherein the generating of the adjusted service level is further based on the at least one user sentiment data; and
    - wherein the generating of the adjusted service level occurs in real-time while the at least one user remains in interaction with the chatbot.

10. The system of claim 9, wherein the storage device is further configured for retrieving agent occupancy data associated with occupancy of the plurality of agents, wherein the processing device is further configured for:
- determining an occupancy status associated with the plurality of agents, wherein the occupancy status comprises an occupancy time displaying insufficiency of the plurality of agents to provide the at least one service;
- comparing the occupancy status with a predetermined threshold time;
- automatically de-classifying at least one low priority intent while the occupancy status displays an insufficiency in the plurality of agents; and
- generating a reclassifying command based on the comparing, wherein the second machine learning model is configured for reclassifying the intent based on the reclassifying command, wherein the assigning of the agent is further based on the reclassifying.

11. The system of claim 9, wherein the at least one third machine learning model comprises a natural language understanding model; and
wherein the at least one sensor data comprises at least one utterance of the at least one user.

12. The system of claim 9, wherein the at least one sensor comprises at least one physiological sensor configured for generating the at least one sensor data based on detecting at least one physiological parameter of the at least one user.

13. The system of claim 9, wherein the processing device is configured for:
- comparing the at least one user sentiment data and the intent; and
- validating the intent based on the comparing of the at least one user sentiment data and the intent, wherein the determining of the intent is further based on the validating.

14. The system of claim 9, wherein the service request data comprises a profile classification data associated with the at least one user, wherein the profile classification data indicates importance of the at least one user based on a user profile, wherein the generating of the adjusted service level is further based on the profile classification data.

15. The system of claim 9, wherein the processing device is further configured for determining a service proficiency level corresponding to the at least one user based on the adjusted service level, wherein the assigning of the agent is further based on the service proficiency level, wherein the assigning the agent comprises assigning the agent possessing relevant skills of the service proficiency level for providing the at least one service to the at least one user.

16. The system of claim 15, wherein the at least one user comprises a first user and a second user, wherein a user profile of the first user is higher than a user profile of the second user, wherein the agent comprises a first agent assigned for providing the at least one service to the first user at a first service proficiency level and a second agent assigned for providing the at least one service to the second user at a second service proficiency level, wherein the first service proficiency level is higher than the second service proficiency level.

\* \* \* \* \*